(12) United States Patent
Ryu

(10) Patent No.: US 10,510,168 B2
(45) Date of Patent: Dec. 17, 2019

(54) METHOD FOR EDITING CHARACTER IMAGE IN CHARACTER IMAGE EDITING APPARATUS AND RECORDING MEDIUM HAVING PROGRAM RECORDED THEREON FOR EXECUTING THE METHOD

(71) Applicant: Jungha Ryu, Seongnam-si (KR)

(72) Inventor: Jungha Ryu, Seongnam-si (KR)

(73) Assignee: Jungha Ryu, Seongnam-si (KR)

( * ) Notice: Subject to any disclaimer, the term of this patent is extended or adjusted under 35 U.S.C. 154(b) by 0 days.

(21) Appl. No.: 14/371,179

(22) PCT Filed: Jan. 9, 2013

(86) PCT No.: PCT/KR2013/000194
§ 371 (c)(1),
(2) Date: Jul. 9, 2014

(87) PCT Pub. No.: WO2013/105793
PCT Pub. Date: Jul. 18, 2013

(65) Prior Publication Data
US 2015/0015587 A1     Jan. 15, 2015

(30) Foreign Application Priority Data

Jan. 9, 2012  (KR) .................. 10-2012-0002557
Feb. 2, 2012  (KR) .................. 10-2012-0010621
Oct. 16, 2012 (KR) .................. 10-2012-0114691

(51) Int. Cl.
*G06T 11/20*     (2006.01)
*G09G 5/24*      (2006.01)
(Continued)

(52) U.S. Cl.
CPC .......... *G06T 11/60* (2013.01); *G06F 17/2217* (2013.01); *G06F 17/2223* (2013.01); *G06T 11/001* (2013.01); *G06F 9/454* (2018.02)

(58) Field of Classification Search
CPC ....... G06T 11/203; G06T 11/40; G06K 15/02; G09G 5/24
(Continued)

(56) References Cited

U.S. PATENT DOCUMENTS 4,962,465 A * 10/1990 Saito .................. G06K 15/02
345/467
5,175,811 A * 12/1992 Sone .................. G09G 5/24
345/469
(Continued)

FOREIGN PATENT DOCUMENTS

GB     2 208 556       4/1989
GB     2208556 B       4/1989
(Continued)

OTHER PUBLICATIONS

International Search Report for PCT/KR2013/000194 dated Jun. 11, 2013.
(Continued)

*Primary Examiner* — Yi Yang
(74) *Attorney, Agent, or Firm* — Xsensus LLP

(57) ABSTRACT

Disclosed are a method for editing a character image in a character image editing apparatus and a recording medium having a program recorded thereon for executing the method. The present invention is implemented through processes of enabling a character image editing apparatus to take, as an input, character information and to generate a dot image at the position corresponding to the position of the margin on the character image relevant to the input character information. According to the present invention, a development of a design can be easily performed in various articles, art work, building, craftwork, city planning in which characters such as Hangul are represented. In addition, according to the present invention, a development of industrial products with symbolized characters such as Hangul can be
(Continued)

promoted in a variety of fields such as industry, art, design, construction, handicraft, and city planning.

41 Claims, 32 Drawing Sheets

(51) Int. Cl.
*G06T 11/60* (2006.01)
*G06F 17/22* (2006.01)
*G06T 11/00* (2006.01)
*G06F 9/451* (2018.01)

(58) Field of Classification Search
USPC .................................................. 345/467–470
See application file for complete search history.

(56) References Cited

U.S. PATENT DOCUMENTS

| | | | |
|---|---|---|---|
| 5,436,974 A | | 7/1995 | Kovanen |
| 5,501,538 A * | | 3/1996 | Sawada .................. B41B 19/00 345/467 |
| 5,793,902 A | | 8/1998 | Watanabe |
| 5,796,409 A * | | 8/1998 | Hersch .................... B41B 19/00 345/468 |
| 2003/0088398 A1* | | 5/2003 | Guo ........................ G06F 3/018 704/8 |
| 2005/0175811 A1 | | 8/2005 | Kubota et al. |
| 2005/0243373 A1 | | 11/2005 | Silverbrook |
| 2006/0098876 A1 | | 5/2006 | Buscema |
| 2007/0128899 A1* | | 6/2007 | Mayer ................... G06F 9/4406 439/152 |
| 2010/0245870 A1* | | 9/2010 | Shibata .................. G06K 9/033 358/1.9 |

FOREIGN PATENT DOCUMENTS

| | | |
|---|---|---|
| JP | 3-55310 | 5/1991 |
| JP | 04-118694 | 4/1992 |
| JP | 11-15589 | 1/1999 |
| KR | 1987-0008247 | 9/1987 |
| KR | 10-2000-0035061 | 6/2000 |
| KR | 10-0355366 | 9/2002 |
| KR | 10-2003-0042618 | 6/2003 |
| KR | 10-2004-0102038 | 12/2004 |
| KR | 10-1478645 | 12/2014 |
| KR | 10-1478646 | 12/2014 |
| WO | 2005/001675 | 1/2005 |
| WO | 2005001675 A2 | 1/2005 |

OTHER PUBLICATIONS

Extended European Search Report dated Oct. 26, 2015 for European Patent Application No. 13736281.0.
George Williams. "*Font Creation with FontForge*", Proceedings of EuroTEX 2003, TUGboat, vol. 24, No. 3, 2003, Jun. 24, 2003 (Jun. 24, 2003), pp. 531-544.
Williams, "Font creation with FontForge." EuroTEX 2003 Proceedings, TUGboat 24.3 (2003): 531-544.

* cited by examiner

FIG.5
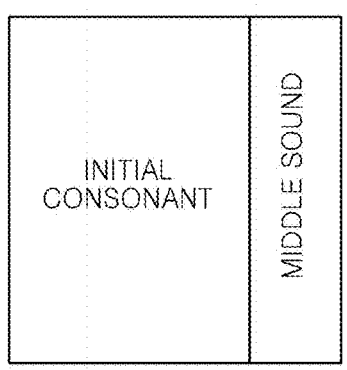
(a)
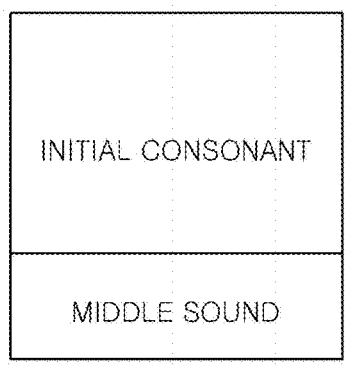
(b)
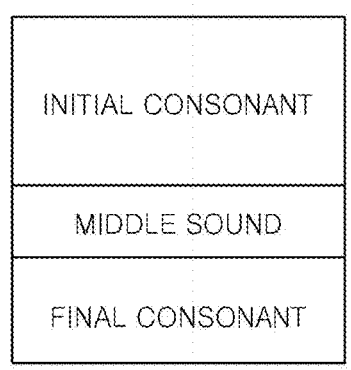
(c)
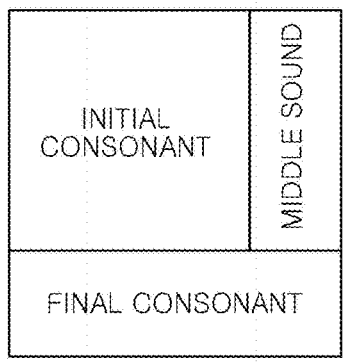
(d)
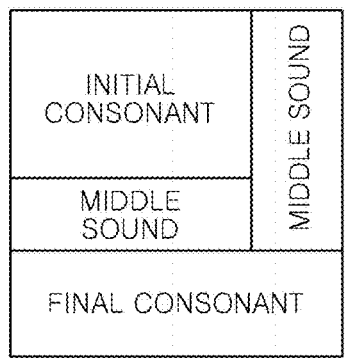
(e)
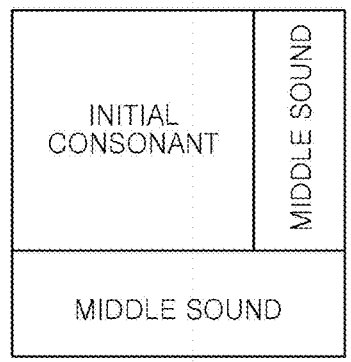
(f)

FIG.35
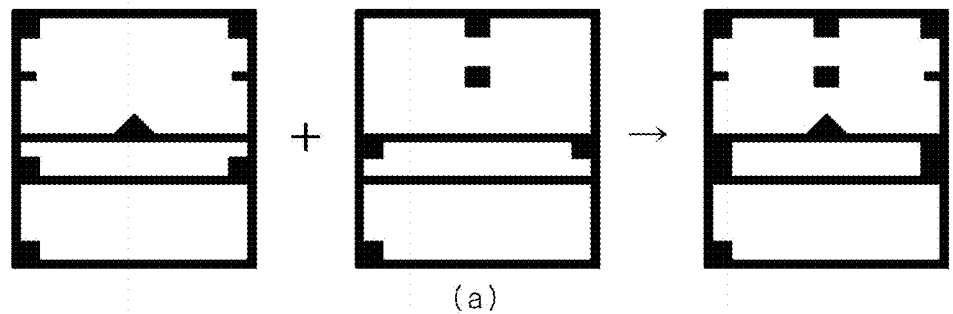
(a)
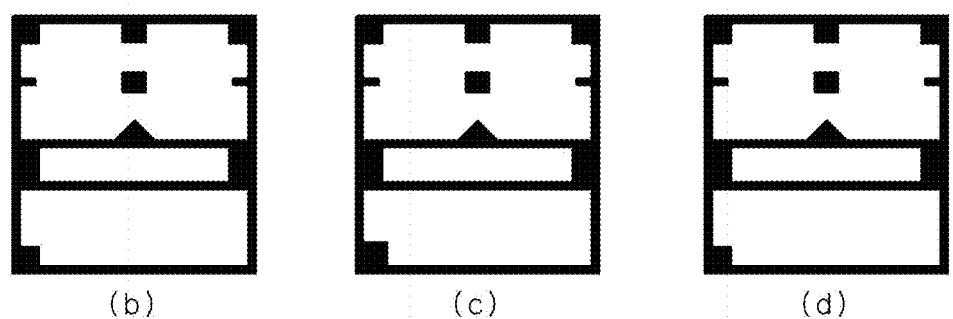
(b)   (c)   (d)

METHOD FOR EDITING CHARACTER IMAGE IN CHARACTER IMAGE EDITING APPARATUS AND RECORDING MEDIUM HAVING PROGRAM RECORDED THEREON FOR EXECUTING THE METHOD

CROSS-REFERENCE TO RELATED APPLICATIONS

This application is the U.S. National Stage of International Patent Application No. PCT/KR2013/000194 filed on Jan. 9, 2013, which claims priority to Korean Patent Application No 10-2012-0002557 filed on Jan. 9, 2012, Korean Patent Application No. 10-2012-0010621 filed on Feb. 2, 2012, and Korean Patent Application No. 10-2012-0114691 filed on Oct. 16, 2012, the disclosures of which are hereby incorporated by reference in their entireties.

TECHNICAL FIELD

The present invention relates to a method for editing a character image in a character image editing apparatus and a recording medium having a program recorded thereon for executing the method. More specifically, the present invention relates to a method for editing a character image in a character image editing apparatus and a recording medium having a program recorded thereon for executing the method, which are adapted to not only facilitate design development in various products, art work, buildings, craftwork, city planning in which characters such as Korean alphabet, English alphabet and numerals are symbolized, but also to promote the development of industrial products in a variety of fields such as industry, art, design, construction, handcraft, and city planning where characters such as Korean alphabet, English alphabet and numerals are symbolized.

BACKGROUND ART

The Korean alphabet invented by the great king Sejong 565 years ago has a scientific principle and formative characteristics that are not found in other characters in the world. Therefore, the Korean alphabet is regarded as a Korean cultural heritage and it is one of the greatest inventions using a scientific principle. However, it is current reality that the Korean alphabet is not being valued and utilized as much in a variety of fields such as industry, art, design, construction and handcraft.

According to a research study, the Korean alphabet is not utilized industrially because of the following reasons. First, consumers do not prefer the Korean alphabet because it is not beautiful in design. Second, companies do not apply the Korean alphabet in their goods because of its low profitability. They believe consumers do not prefer it or normally recognize it as tourism product.

In modern times, as image media is developed, the importance of transferring image information other than texting becomes higher. For example, in regard to starvation/refugee relief, it is more appealing when an image combines with characters and/or numerals rather than an appeal with tedious letters and/or numerals only. Therefore, it is desperately needed to symbolize the meaning of the language and make better use of it industrially rather than treat it as simple medium to transfer information. Especially, by symbolizing the characters or numerals of languages in industrial products (articles, artworks, buildings, crafts, and structures) in a variety of fields such as industry, art, design, construction, handcraft, and city building, the value of languages will be reconsidered and reassessed in the industrial sector.

DISCLOSURE

Technical Problem

In view of the above, the present invention provides an editing method for a character image in a character image editing apparatus and a machine readable recording medium having a program recorded thereon for executing the method, which promote design development in character-symbolized products such as art work, buildings, and craftwork, and city planning and also facilitates the development of character-symbolized industrial products in various fields such as industry, art, design, construction, handcraft, and city planning.

Technical Solution

An exemplary embodiment of the present disclosure provides an editing method for a character image used in a character image editing apparatus, which includes: (a) receiving, by the apparatus, character information; and (b) generating, by the apparatus, a dot image on a position corresponding to that of an empty space in a character image which is relevant to the received character information.

In the embodiment, the editing method further comprising, after the step (b), adjusting the size or position of the generated dot image.

In the embodiment, the shape of the dot image is determined depending on the shape of an empty space in the character image.

In the embodiment, the shape of the dot image comprises any one of triangle, rectangle and circle.

In the embodiment, the editing method further comprising, after the step (b), (c) additionally generating, by the apparatus, a dot image on a position corresponding to that of an empty space in a character image that is relevant to character information received additionally from the outside.

In the embodiment, the editing method further comprising, after the step (c), (d) overlapping, by the apparatus, the additionally generated dot image on the dot image generated at the step (b).

In the embodiment, at the step (d), the dot image generated at the step (b) is identified from the dot image generated additionally at the step (c) depending on at least one of color, light and shade, brightness, pattern and texture.

In the embodiment, the step (b) comprises generating a dot image on a position corresponding to that of an empty space in each image for initial consonant, middle vowel and final consonant of the Korean alphabet that are relevant to Korean alphabet information of the received character.

An exemplary embodiment of the present disclosure provides an editing method for a character image in a character image editing apparatus, which includes: (a) receiving, by the apparatus, character information; and (b) generating, by the apparatus, a dot image which is relevant to the received character information, wherein the dot image is an image in which dots are formed on the position corresponding to that of an empty space in a character image that is relevant to the received character information.

In the embodiment, a machine readable recording medium including a computer-executable program, when executed, to cause a machine to perform the method.

An exemplary embodiment of the present disclosure provides an apparatus for editing a character image, which includes: an input unit configured to receive character information; and a generator configured to generate a dot image on a position corresponding to that of an empty space in a character image that is relevant to character information received at the input unit.

In the embodiment, the apparatus further comprising an editor configured to adjust the size or position of the dot image generated by the generator.

In the embodiment, the shape of the dot image is determined depending on the shape of the empty space in the character image.

In the embodiment, the shape of the dot image comprises any one of triangle, rectangle and circle.

In the embodiment, the generator is further configured to additionally generate a dot image on a position corresponding to that of an empty space in a character image that is relevant to the character information additionally received at the input unit.

In the embodiment, the editor overlaps the additionally generated dot image on the dot image generated already.

In the embodiment, the dot image generated already and the additionally generated dot image are identified from each other depending on at least one of color, light and shade, brightness, pattern and texture.

In the embodiment, the generator generates a dot image on a position corresponding to that of an empty space in each image by initial consonant, middle vowel and final consonant of the Korean alphabet that are relevant to Korean alphabet information of the received character.

An exemplary embodiment of the present disclosure provides an apparatus for editing a character image, which includes: an input unit configured to receive character information; and a generator configured to generate a dot image that is relevant to the character information received at the input unit, wherein the dot image is an image in which dots are formed on a position corresponding to that of an empty space in a character image that is relevant to the received character information.

Advantageous Effects

With the present invention, it comes to facilitate design development in various products, artworks, buildings, crafts, city planning in which characters including Korean alphabet are symbolized.

Also, with the present invention, it comes to promote the development of character (including Korean alphabet)-symbolized industrial products in a variety of fields such as industry, art, design, construction, handcraft and city planning.

DESCRIPTION OF DRAWINGS

FIGS. 1A to 3K are diagrams explaining a principle to generate a dot image corresponding to a Korean alphabet in a method for editing a character image in accordance with an embodiment of the present invention.

FIGS. 5A to 5F are diagrams showing an area in which dot images for initial consonants, middle vowels and final consonants are generated in the editing method for a character image in accordance with an embodiment of the present invention.

FIGS. 23A to 27 are diagrams illustrating free transformations of space division in accordance with an embodiment of the present invention.

FIGS. 35A to 35D are diagrams illustrating an example in which characters are overlapped in accordance with an embodiment of the present invention.

BEST MODE

Figure 1:
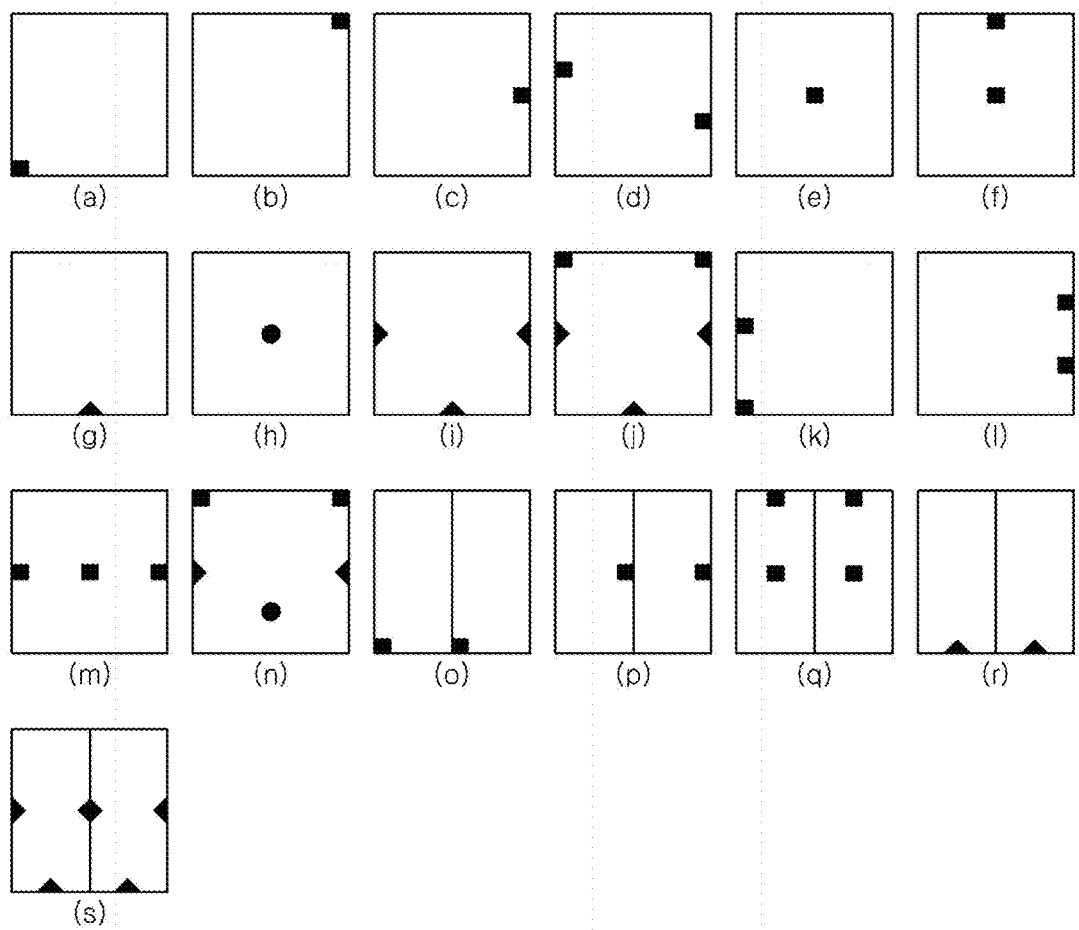
Figure 2:
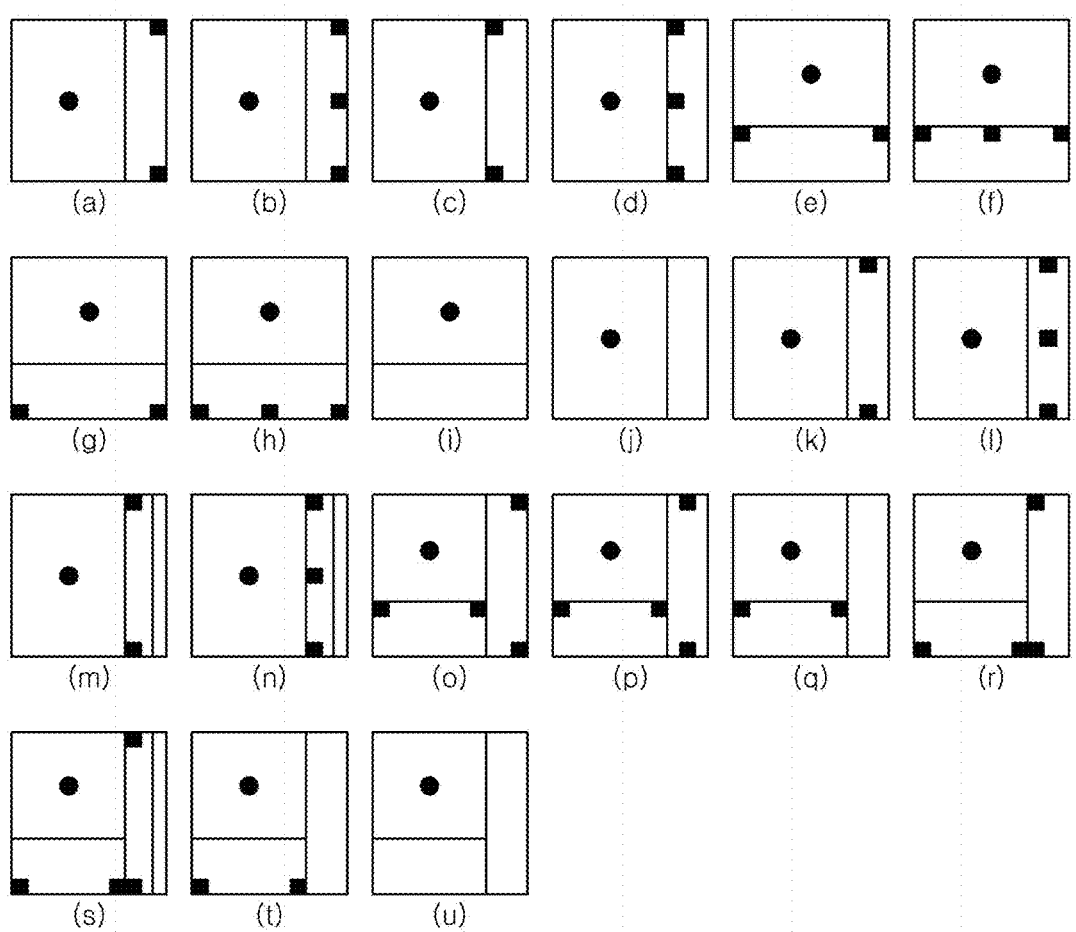

Exemplary embodiments of the present invention will be described below in more detail with reference to the accompanying drawings. In every possible case, like reference numerals are used to refer to the same or similar elements in the description and drawings. Moreover, detailed descriptions related to well-known functions or configuration will be omitted not to obscure subject matters of the present invention.

FIGS. 1A to 3K are diagrams explaining the principle to generate a dot image corresponding to the Korean alphabet in an editing method for a character image in accordance with an embodiment of the present invention.

First, FIGS. 1A to 1S illustrate the principle to generate a dot image corresponding to an initial consonant of the Korean alphabet. Specifically, FIG. 1A illustrates a rectangular dot image generated based on the empty rectangular shape as shown at the lower left corner of 'ㄱ'; FIG. 1B illustrates a rectangular dot image generated based on the empty rectangular shape as shown at the upper right corner of 'ㄴ'; and FIG. 1C illustrates a rectangular dot image generated based on the empty rectangular shape as shown at the middle right corner of 'ㄷ'.

Meanwhile, FIG. 1D illustrates a rectangular dot image generated based on the empty rectangular shape as shown in 'ㄹ', and FIG. 1E illustrates a rectangular dot image generated based on the empty rectangular shape as shown at the center of 'ㅁ'.

Further, FIG. 1F illustrates rectangular dot images generated based on the empty rectangular shapes as shown at the center and middle upper corner of 'ㅂ'; FIG. 1G illustrates a triangular dot image generated based on the triangular shape at the middle bottom corner of 'ㅅ'; and FIG. 1H illustrates a circular dot image generated based on the circular shape as shown at the center of 'ㅇ'.

For reference, in accordance with the present invention, only when the shape of empty space in each image of the Korean alphabet is a rectangle, triangle or circle, a dot image whose shape is identical to the shape of empty space is generated. That is, when the empty shape on each image of the Korean alphabet is not equivalent to any one of rectangle, triangle and circle, it is desirable not to generate dot images on the empty space.

When analyzing the remaining dot images in FIGS. 1A to 1S in accordance with the rule described above, it can be understood that FIG. 1I illustrates a dot image corresponding to 'ㅈ'; FIG. 1J illustrates a dot image corresponding to 'ㅊ'; FIG. 1K illustrates a dot image corresponding to 'ㅋ'; FIG. 1L illustrates a dot image corresponding to 'ㅌ'; FIG. 1M illustrates a dot image corresponding to 'ㅍ'; FIG. 1N illustrates a dot image corresponding to 'ㅎ'; FIG. 1O illustrates a dot image corresponding to 'ㄲ'; FIG. 1P illustrates a dot image corresponding to 'ㄸ'; FIG. 1Q illustrates a dot image corresponding to 'ㅃ'; FIG. 1R illustrates a dot image corresponding to 'ㅆ'; and FIG. 1S illustrates a dot image corresponding to 'ㅉ'.

Meanwhile, FIGS. 2A to 2U illustrates the principle to generate a dot image corresponding to a combined character with an initial consonant and a middle vowel of the Korean alphabet. When generating a dot image corresponding to a character with the combination of an initial consonant and a middle vowel as in FIGS. 2A to 2U, the rectangular image frame from FIGS. 1A to 1S is divided into an initial consonant area and a middle vowel area as illustrated in FIGS. 5A and 5B and dot images corresponding to the initial consonant and middle vowel are independently generated in the initial image frame and in the middle image frame.

The principle to generate the dot image corresponding to the initial consonant on the initial consonant frame is the same as the principle explained in FIG. 1A to 1S. In the present invention, when generating dot images corresponding to the middle vowel on the middle image frame, the rectangular dot image having the same shape as that of the empty space is generated in the position corresponding to the empty space position on the middle vowel image.

When analyzing characters indicated by each dot image in FIGS. 2A to 2S in accordance with the principle to generate the dot image above, FIG. 2A illustrates a dot image corresponding to '아'; FIG. 2B illustrates a dot image corresponding to '야'; FIG. 2C illustrates a dot image corresponding to '어'; FIG. 2D illustrates a dot image corresponding to '여'. FIG. 2E illustrates a dot image corresponding to '오'; FIG. 2F illustrates a dot image corresponding to '요'; FIG. 2G illustrates a dot image corresponding to '우'; FIG. 2H illustrates a dot image corresponding to '유'; FIG. 2I illustrates a dot image corresponding to '으'; FIG. 2J illustrates a dot image corresponding to '이'; FIG. 2K illustrates a dot image corresponding to '애'; and FIG. 2L illustrates a dot image corresponding to '얘'.

In case of 'ㅔ' and 'ㅖ' among middle vowels, on the other hand, in order to separate them from 'ㅐ' and 'ㅒ', it is desirable to divide the middle vowel image frame by two in the longitudinal direction as illustrated in FIGS. 2M and 2N so that 'ㅔ' is written in 'ㅓ + ㅣ' and 'ㅖ' is written in 'ㅕ + ㅣ'.

Accordingly, FIG. 2M becomes a dot image corresponding to '에' and FIG. 2L becomes a dot image corresponding to '예'.

In the case of double vowel, it is desirable to generate each dot image of vowels independently after dividing the middle vowel image frame into lower part and right part from the whole rectangular image frame.

Accordingly, FIG. 2O illustrates a dot image corresponding to '와'; FIG. 2P illustrates a dot image corresponding to '왜'; FIG. 2Q illustrates a dot image corresponding to '외'; FIG. 2R illustrates a dot image corresponding to '워'; FIG. 2S illustrates a dot image corresponding to '웨'; FIG. 2T illustrates a dot image corresponding to '위'; and FIG. 2U illustrates a dot image corresponding to '의'.

Meanwhile, when generating a dot image corresponding to a combined character with initial consonant, middle vowel and final consonant, as illustrated in FIGS. 5A to 5F, the rectangular image frame in FIGS. 1A to 1S is divided into an initial consonant area, a middle vowel area and a final consonant area, and each dot image corresponding to initial consonant, middle vowel and final consonant is independently generated in the initial consonant image frame, middle vowel image frame and final consonant image frame.

FIGS. 3A to 3K explains the principle to generate a dot image corresponding to final consonant of the Korean alphabet on a final consonant image frame. Meanwhile, since all the initial consonants of the Korean alphabet can also be used as the final consonants, the principle to generate dot images corresponding to consonants that are used as the final consonants of the Korean alphabet is only explained in FIGS. 3A to 3K.

In the case of pair-consonants used only in final consonants, not in initial consonants, the final consonant image frame is divided into two areas as in other pair-consonants of the Korean alphabet, and a dot image corresponding to each consonant is generated on each divided image frame.

Accordingly, FIG. 3A indicates a dot image corresponding to 'ㄱㅅ'; FIG. 3B indicates a dot image corresponding to 'ㄴㅈ'; FIG. 3C indicates a dot image corresponding to 'ㄴㅎ'; FIG. 3D indicates a dot image corresponding to 'ㄹㄱ'; FIG. 3E indicates a dot image corresponding to 'ㄹㅁ'; FIG. 3F indicates a dot image corresponding to 'ㄹㅂ'; FIG. 3G indicates a dot image corresponding to 'ㄹㅅ'; FIG. 3H indicates a dot image corresponding to 'ㄹㅌ'; FIG. 3I indicates a dot image corresponding to 'ㄹㅍ'; FIG. 3J indicates a dot image corresponding to 'ㄹㅎ'; and FIG. 3K indicates a dot image corresponding to 'ㅂㅅ'.

Figure 10:
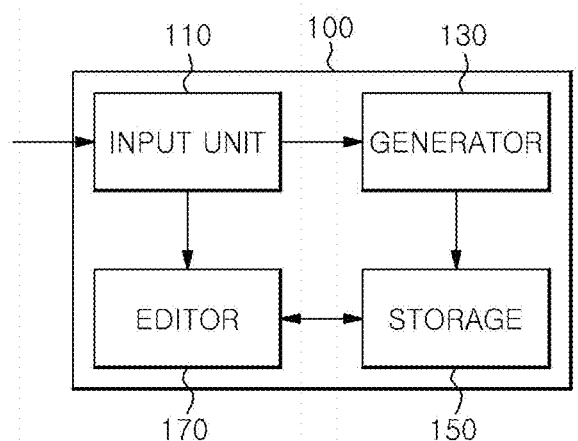
FIG. 10 is a functional block diagram explaining a structure of an editing apparatus for a character image in accordance with an embodiment of the present invention.

FIG. 10 is a functional block diagram explaining a structure of an editing apparatus for a character image in accordance with an embodiment of the present invention. Referring to FIG. 10, the editing apparatus 100 for a character image in accordance with an embodiment of the present invention includes an input unit 110, a generator 130, a storage 150 and an editor 170.

First, the input unit 110 of the editing apparatus 100 for a character image is used to input Korean alphabet information for which a user wishes to edit images, and it is also used to input editing instructions for dot images generated by a user.

Figure 3:
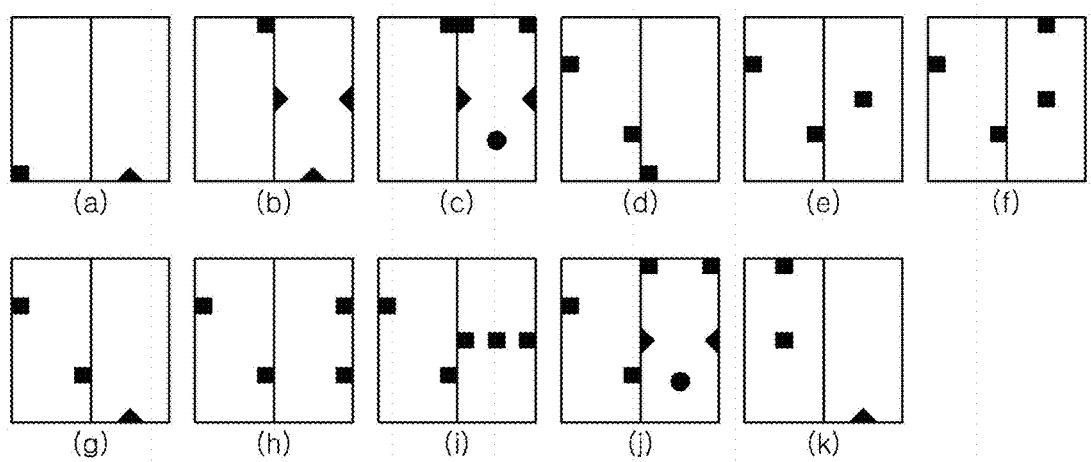

The generator 130 of the editing apparatus 100 for a character image, as generated in FIGS. 1, 3 and 5, generates dot images on the position corresponding to the empty space in a Korean alphabet image that is relevant to Korean alphabet information, which is input through the input unit 110, and the generated dot images are displayed in the display unit and stored in the storage 150.

In practicing the present invention, all the Korean alphabet dot mages generated by the dot image generation principles through FIGS. 1A to 3K and FIGS. 5A to 5F have already been mapped and stored. Therefore, it is possible for the generator 130 to display the stored dot images in the storage 150 on the display unit.

The editor 170 performs a function to edit dot images according to an editing instruction when a user enters the editing instruction to adjust the size or position of the dot images displayed on the display unit through the input unit 110.

Figure 11:
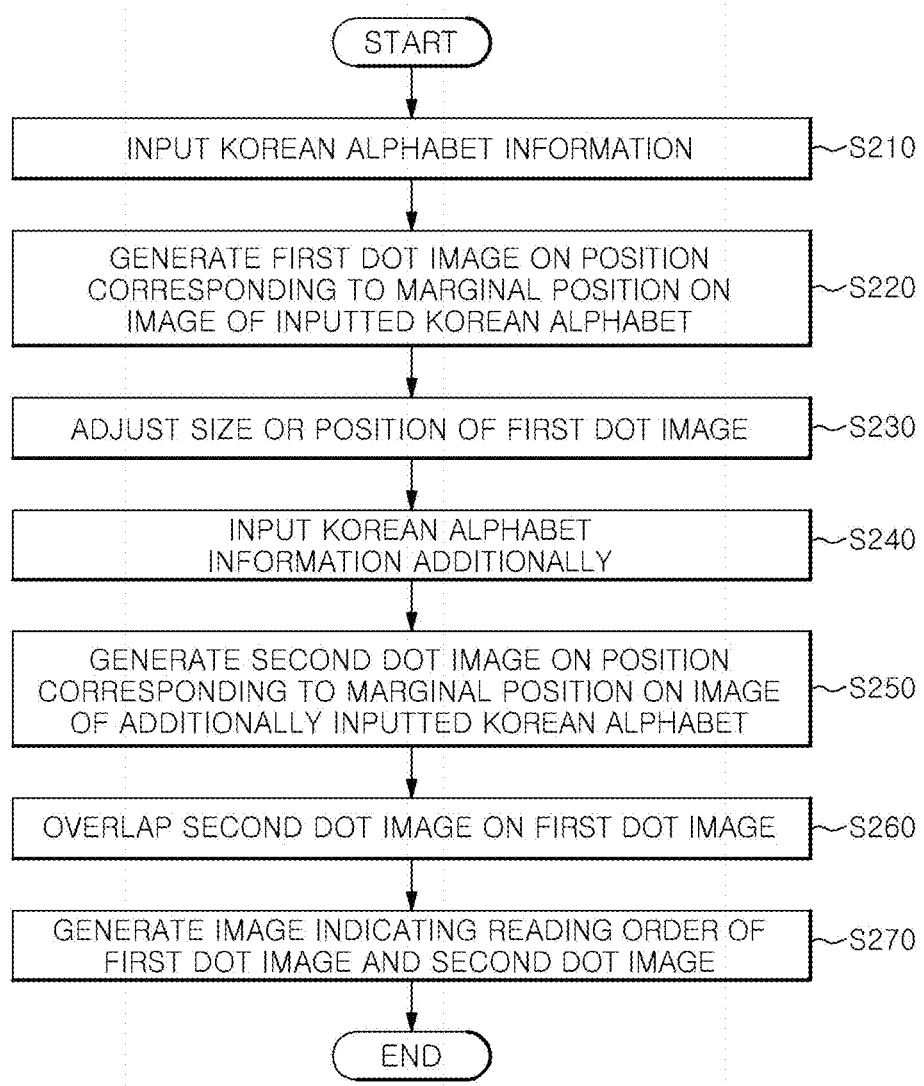
FIG. 11 is a flowchart explaining the principle of an editing method for a character image in accordance with an embodiment of the present invention.

FIG. 11 is a flowchart explaining the principle of a method for editing a character image in accordance with an embodiment of the present invention. When describing the principle of the editing method for a character image in accordance with an embodiment of the present invention with reference to FIG. 11, first, a user inputs a character whose dot image needs to be generated and edited through the input unit 110 of the editing apparatus 100 for a character image (S210).

Accordingly, the generator 130 of the editing apparatus 100 for a character image generates a dot image on the position corresponding to the empty space on a Koran alphabet image inputted at the input unit 110 according to the method described in FIGS. 1 to 3 and 5 (S220), and the generated dot image is stored in the storage 150.

Meanwhile, in practicing the present invention, the generator 130 of the editing apparatus 100 for a character image generates dot images either according to the principle described in FIGS. 1A to 3K, or according to deformed shapes of dots as illustrated in FIGS. 4A to 4I.

Figure 4:
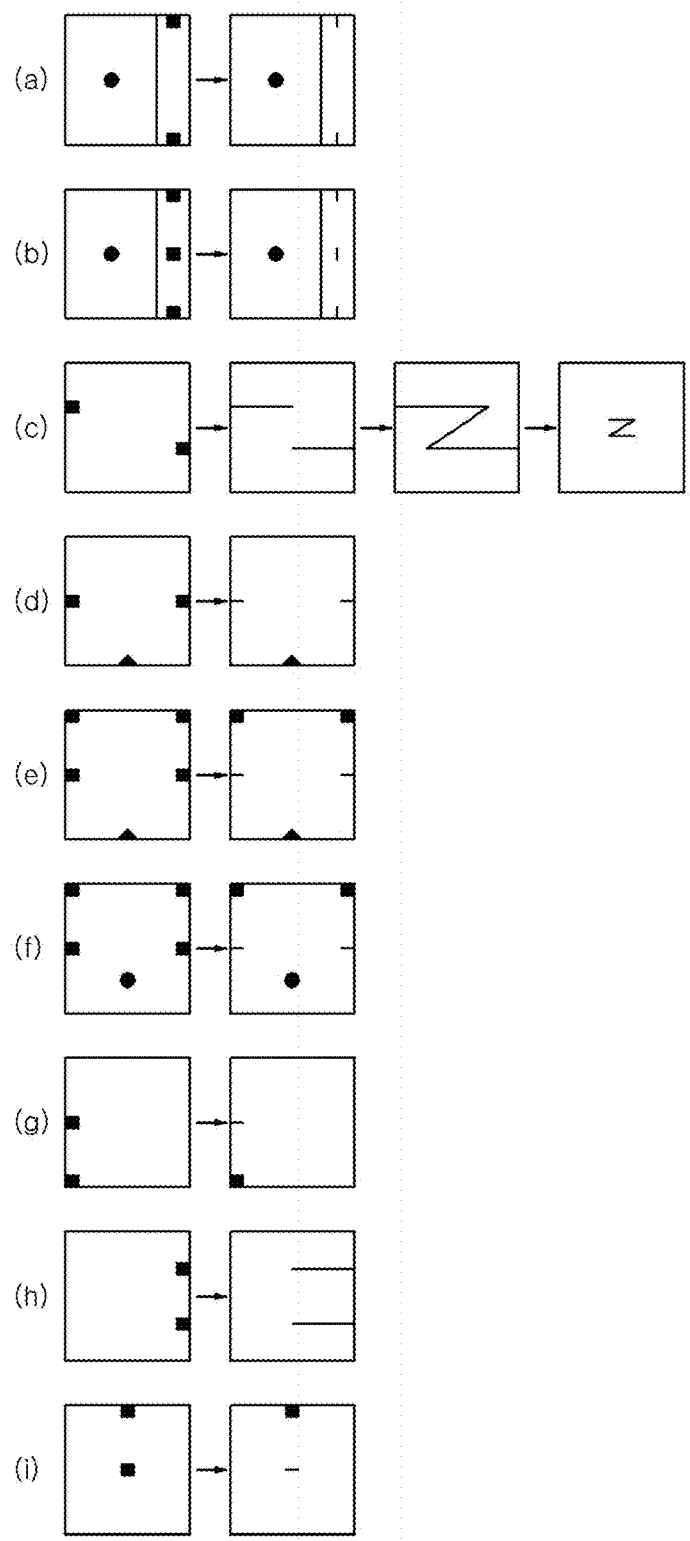
FIGS. 4A to 4I are diagrams explaining a principle to transform and generate a dot image in accordance with a transformed embodiment of the present invention.

That is, it is possible that a rectangular dot indicating a vowel as in FIGS. 4A and 4B is substituted with a short longitudinal segment. Left and right rectangular dots indicating 'ㄹ' among consonants as in FIG. 4C also can be substituted with transversal segments, or by connecting a transversal segment to a diagonal segment, they can be expressed in the form of 'z' that is a downsized form of 'Z'.

Further, as illustrated in FIGS. 4D, 4E and 4F, short transversal segments can substitute for rectangular dot images in the middle of the left and right sides among the dots indicative of 'ㅈ', 'ㅊ', and 'ㅎ'.

Meanwhile, in practicing the present invention, a user can enter Arabic numerals as well as the Korean alphabet in the editing apparatus 100 for a character image. In this case, the present invention may also function as the editing apparatus 100 for a numeral image.

Specifically, FIGS. 7A to 7J describes the principle to generate dot images corresponding to Arabic numerals. As in FIG. 7A, when '0' is entered into the input unit 110, the generator 130 generates a circular dot image in the middle of the empty space, which in this case is the center of '0'. Further, in case that '1' is entered into the input unit 110 as in FIG. 7B, '1' has a numeral without any empty space; therefore, the generator 130 generates an image having no dot.

Also, as illustrated in FIGS. 7C to 7J, once '2' to '9' are entered into the input unit 110, the generator 130 generates a rectangular, circular or triangular dot image (that is, a dot image having the same shape as the empty space) on the position corresponding to the empty space in '2' to '9'.

Figure 15:
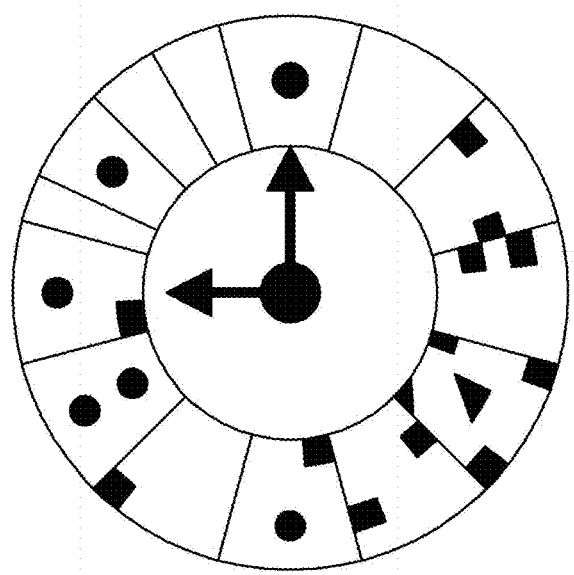
FIG. 15 is a diagram illustrating a clock design that utilizes numerals expressed by space division and symbol in accordance with an embodiment of the present invention.

As described above, the dot images corresponding to numerals may be applied to a clock as illustrated in FIG. 15 so that numerals may be expressed by space division and symbols.

Once a user generates dot images corresponding to the Korean alphabet through the editing apparatus 100 for character images, it is possible to edit the generated dot image freely. Specifically, when necessary, a user can control the size or shape of a rectangular image frame through the input unit 110, or can control the size or relative ratio of initial consonant image frame, middle vowel image frame and final consonant image frame that constructs the rectangular image frame. Also, the user can control the size of each dot that constructs the dot image, or can input instructions to change the thickness of the borders of each image frame and segment indication method (dotted line, solid line, etc.).

Accordingly, the editor 170 of the editing apparatus 100 for a character image controls the size or position of the dot image indicated on a display unit and stores the dot image in the storage 150 (S230).

Figure 6:
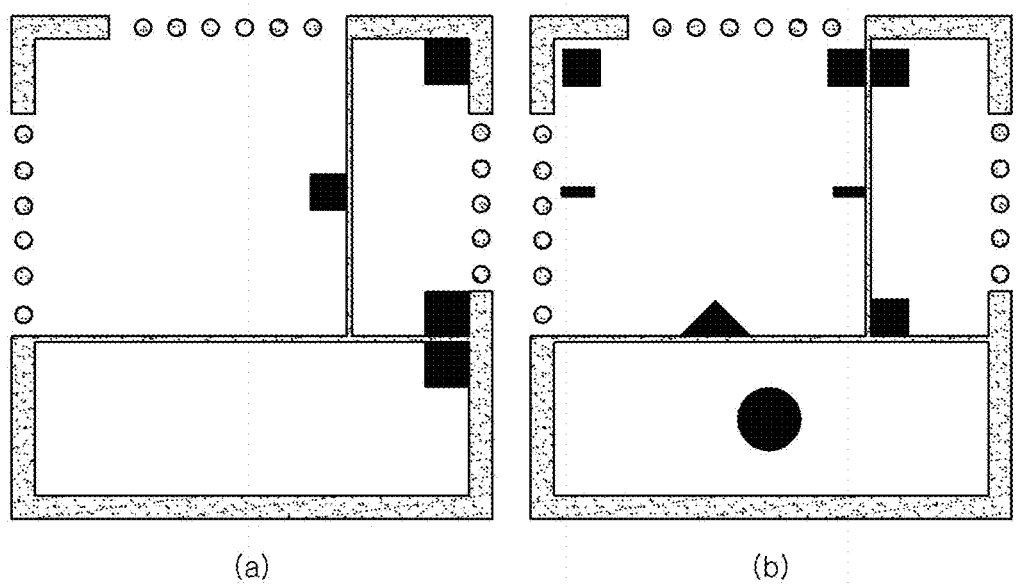
FIGS. 6A and 6B are diagrams illustrating an example of the edited Korean alphabet image in accordance with an application of the present invention.
Figure 7:
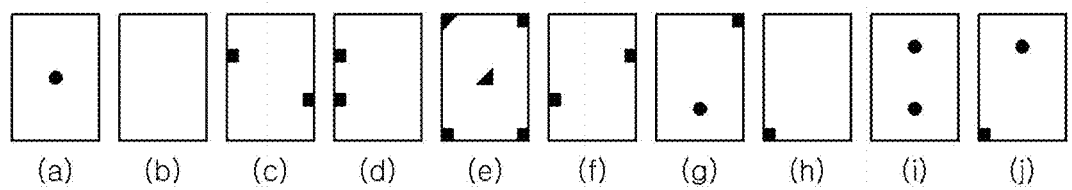
FIGS. 7A to 7J are diagrams explaining the principle to generate a dot image corresponding to Arabic numerals.

Specifically, as illustrated in FIGS. 6A and 6B, a user can control the border thickness of the rectangular image frame and edit the segment indication method from solid to dotted from the dot images of '단' and '청'.

Figure 8:
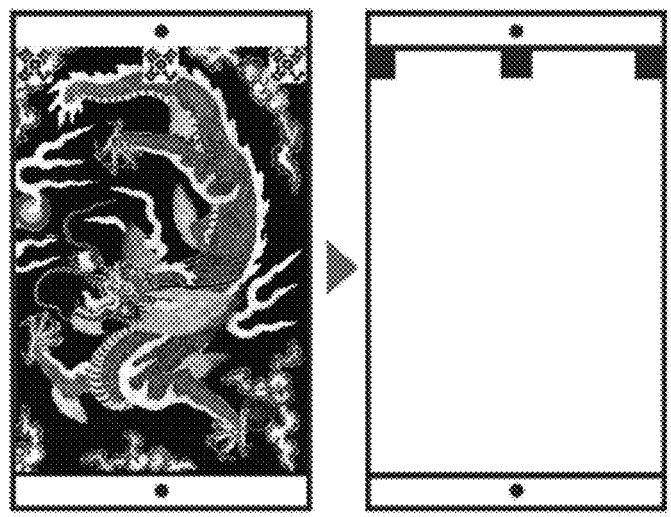
FIGS. 8A to 8B are diagrams illustrating another example of the edited Korean alphabet image in accordance with an application of the present invention.

Additionally, a user can edit the dot image of '용' to expand the middle vowel image frame in the longitudinal direction as shown in the left figure of FIGS. 8A and 8B. The dot image of edited '용', as shown in the right picture of FIGS. 8A and 8B, can provide an enough space to draw a picture about '용' (meaning a dragon in English).

Meanwhile, a user may input additional Korean alphabet information through the input unit 110 when needed (S240). In this case, the generator 130 of the editing apparatus 100 for a character image generates dot images for the added Korean alphabet according to the process in the step S220 described above (S250), and the generated dot image is stored in the storage 150.

Meanwhile, a user may edit to overlap additionally generated dot image (second dot image) with the initially generated dot image (first dot image). In this case, the editor 170 of the editing apparatus 100 for a character image edits to overlap the second dot image on the first dot image as in FIGS. 9A to 9C (S260).

Since it is desirable that the overlapped second dot image can be separated from the first dot image, it is advantageous that the editor 170 edits at least one of color, light and shade, brightness, pattern, and texture differently from the first dot image. In practicing the present invention, a user may input an editing instruction to make at least one of the color, light and shade, brightness, pattern, and texture of the second dot image different from the first dot image through the input unit 110.

It is desirable that the overlapped two dot images are displayed on the image whose reading order has been edited. Accordingly, the editor 170 of the editing apparatus 100 for a character image displays the identifier that is same as at least one of color, light and shade, brightness, pattern, and texture from the first dot image in front as shown in the first figure of FIGS. 9A to 9C. And by displaying the identifier that is same as at least one of color, light and shade, brightness, pattern, and texture from the second dot image at the back as shown in the first figure of FIGS. 9A to 9C, it helps the third parties to read '한' in the second image of FIGS. 9A to 9C first through the edited dot image which is the first image of FIGS. 9A to 9C and to read '글' in the third image of FIGS. 9A to 9C later. Therefore, it is desirable to read the edited dot image, which is the first image of FIGS. 9A to 9C, as '한글'.

Figure 12:
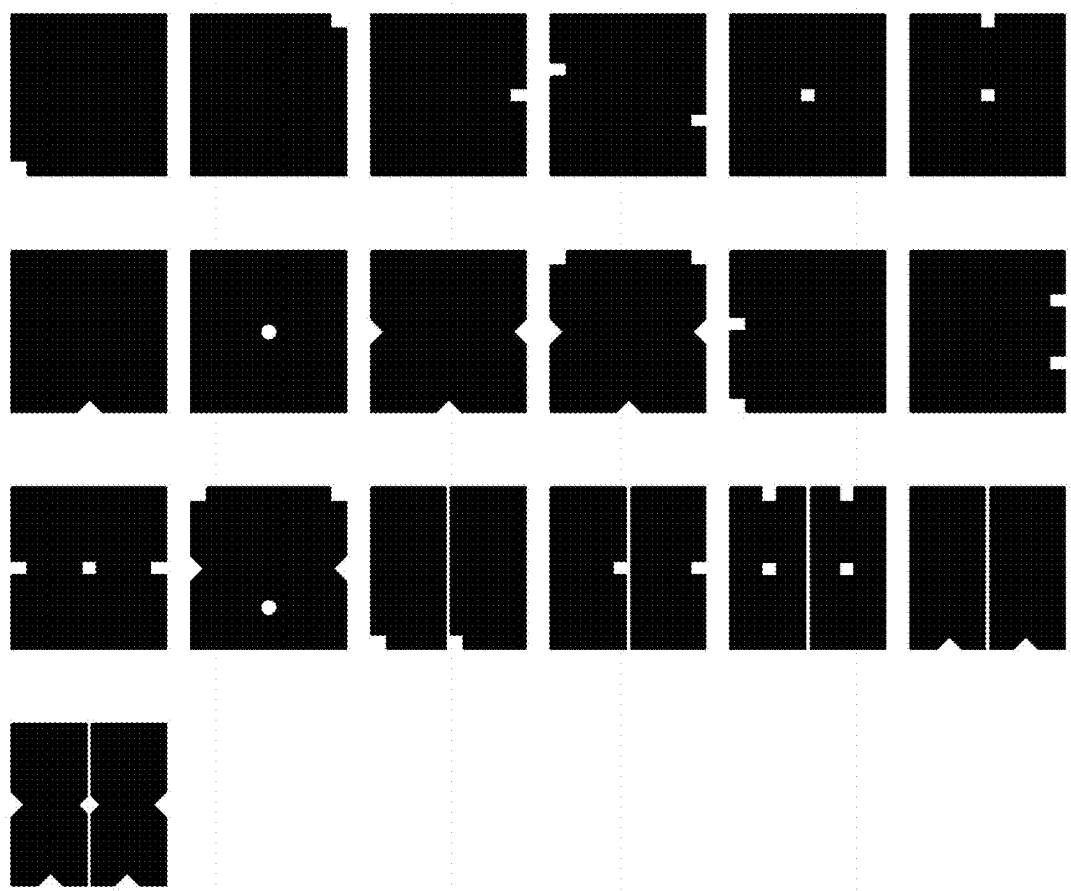
FIGS. 12 and 13 are diagrams illustrating a reversal image of characters in accordance with an embodiment of the present invention.
Figure 13:
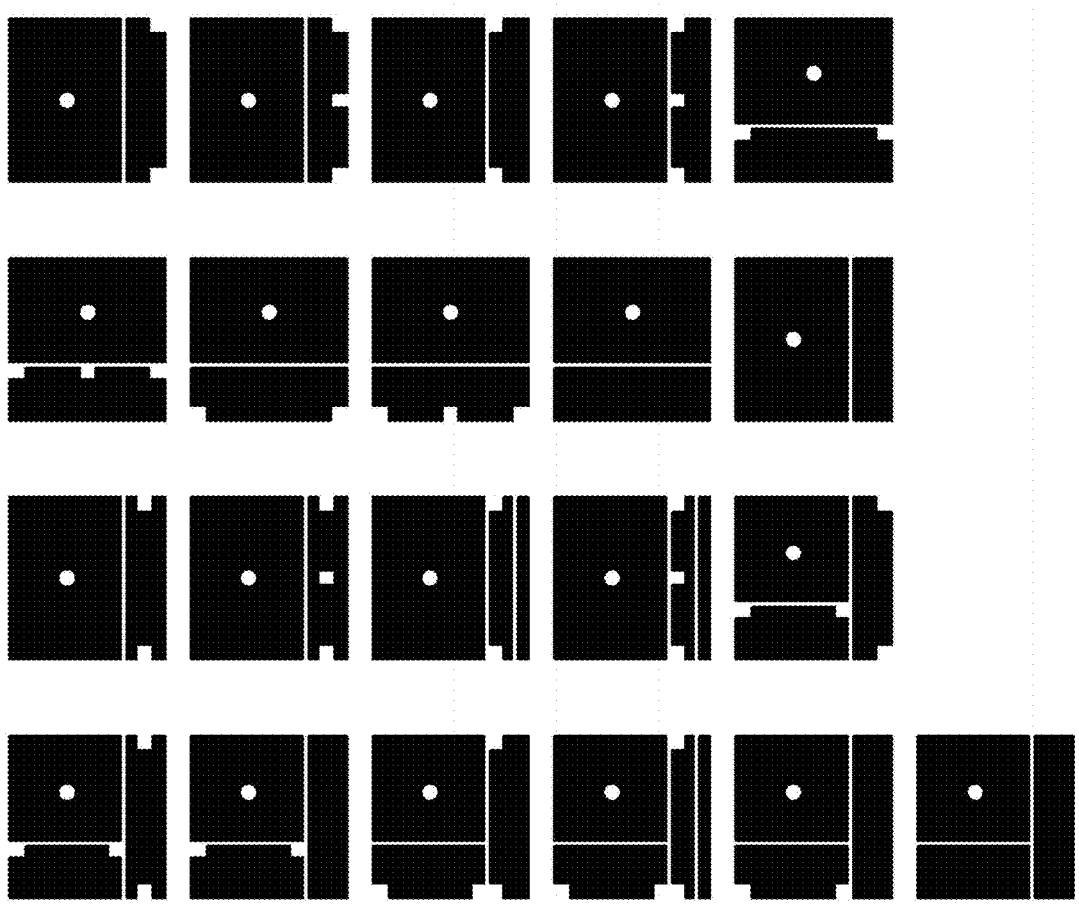

In practicing the present invention, in case that the generator 130 of the editing apparatus 100 for a character image generates images, it can generate such images as in FIG. 1A to FIG. 3K, or it can also generate reversed images as illustrated in FIGS. 12 and 13.

Further, in practicing the present invention, after the generator 130 of the editing apparatus 100 for a character image generates such images as in FIG. 1A to FIG. 3K, it is possible for a user to generate such reversed images as in FIGS. 12 and 13 by the editor 170.

With such reversed images in FIGS. 12 and 13, it will bring more practical benefits to users since the meaning of the Korean alphabet will be transferred in a more direct manner.

Meanwhile, a term 'symbol image' used hereinafter in this specification includes dot image and especially, it represents the character of the Korean alphabet symbolically. That is, it is a symbol that occupies a part of a certain divided space (for example, a rectangular image frame). Further, the symbol image corresponding to English characters or numerals express the English alphabet or numerals symbolically. It is the symbol that occupies a part of a certain divided space (for example, rectangular image frame). In this case, the symbol is formed by putting characters or numerals of the language (Korean alphabet, English alphabet, etc.) in a predetermined frame and then by simplifying the identified shape from the empty space into dot, line and face. In this process, the dot can have a variety of shapes including triangle, rectangle, circle, etc.

Further, describing the operational principle of the editing apparatus 100 for a character image in a more fundamental manner, the editing apparatus 100 for a character image interprets characters of languages (Korean alphabet, English alphabet, etc.) (including numerals) as symbol images, or interprets symbol images as characters (including numerals) of the relevant language, and then it prints them out.

As described above, the symbol image corresponding to characters of the Korean alphabet is a symbolical expression of the characters or numerals of the language. It is a symbol that occupies a part of a certain divided space (for example, rectangular image frame). The symbol is formed by putting characters or numerals of the language (Korean alphabet, English alphabet, etc.) in a predetermined frame and then by simplifying the identified shape from the empty space into dot, line and face. In this process, the dot can have a variety of shapes including triangle, rectangle, circle, etc.

The symbol image symbolizing characters or numerals of a language is defined not as flat objects that are used to print characters or numerals of the language but as objects that have volume and mass. Therefore, it is based on a character/numeral processing technology in which characters or numerals are formed as if a casting is made when molten metal is poured into a predesigned empty space called cast. The processing procedure of the characters and numerals is illustrated in two dimensions in FIG. 14.

That is, by adding spatial concept to the characters of language or numerals, it generates simplified space. After extracting such symbols as triangle, rectangle and circle through the process of the characters of language or numerals, these symbols are placed to express the characters of language or numerals symbolically.

Therefore, the symbol image of the Korean alphabet generated by the generator 130 is expressed as a first space that is desirably divided to express at least one Korean alphabet (at least one syllable), a space division that divides the first space using dots, lines, faces, or other expressions (the first space being divided into second spaces by spatially dividing the first space) and can symbolically express the Korean alphabet by performing any function of initial consonant, middle vowel and final consonant in the divided second spaces, and at least one symbol of triangle, rectangle, circle and straight line that are placed in the second spaces classified by the space division.

Here, each of the second spaces that are classified by the space division may be constructed of the transversal direction, the longitudinal direction or the combination thereof, and each of the first space is separately placed in the transversal or longitudinal direction.

Meanwhile, in practicing the present invention, the editing apparatus 100 for a character image may additionally include an output unit, and accordingly, the symbol image generated by the generator 130 may be outputted through the output unit in real time.

Further, in practicing the present invention, the symbol image may be inputted through the input 110, the generator 130 analyzes the symbol image and extracts characters corresponding to the symbol image, and the extracted characters may be outputted through the output unit in real time.

Figure 14:
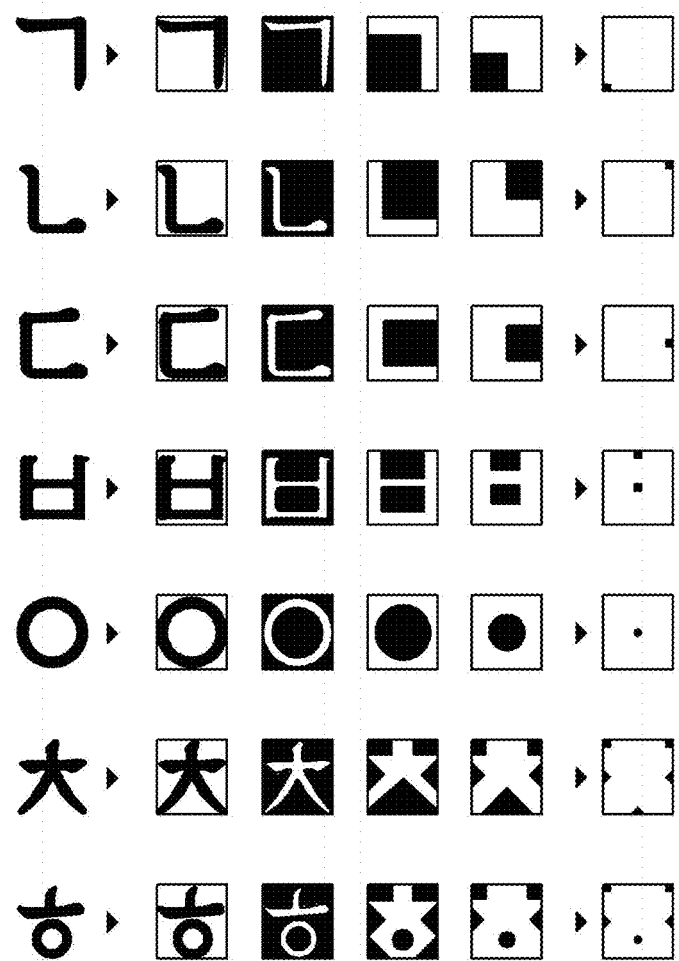
FIG. 14 is a diagram illustrating a procedure to extract symbol image in accordance with an embodiment of the present invention.

Meanwhile, in the process of the generator 130 analyzing the symbol image and extracting characters corresponding to the symbol image, it will be possible to extract characters from the symbol image by applying the calculation reversely in which the symbol image is generated from each character in FIG. 14.

The editing apparatus 100 for a character image converts characters of the language (Korean alphabet, English alphabet, etc.) (including numerals) inputted through the input 110 into symbol images, and outputs through the output unit 140 in real time. Also, the editing apparatus 100 for a character image analyzes the symbol images inputted through the input 110 and outputs the characters of the relevant language (including numerals) through the output unit 140 in real time.

Meanwhile, in case that an English word input mode is executed in accordance with the present invention, the number of English alphabet can be expressed by 52 letters in total, 26 of capital letters and 26 of small letters. Out of 26 capital letters (/small letters) of English alphabet, 21 of them except for 5 vowels; that is, "A(a)", "E(e)", "I(i)", "O(o)" and "U(u)" are referred to as "consonant Alphabet". That is, English capital letters (/small letters) consist of 21 consonant alphabets (that is, 'B(b)', 'C(c)', 'D(d)', 'F(f)', 'G(g)', 'H(h)', 'J(j)', 'K(k)', 'L(l)', 'M(m)', 'N(n)', 'P(p)', 'Q(q)', 'R(r)', 'S(s)', 'T(t)', 'V(v)', 'W(w)', 'X(x)', 'Y(y)' and 'Z(z)', and 5 vowel alphabets (that is, 'A(a)', 'E€', 'I(i)', 'O(o)' and 'U(u)'.

Figure 16:
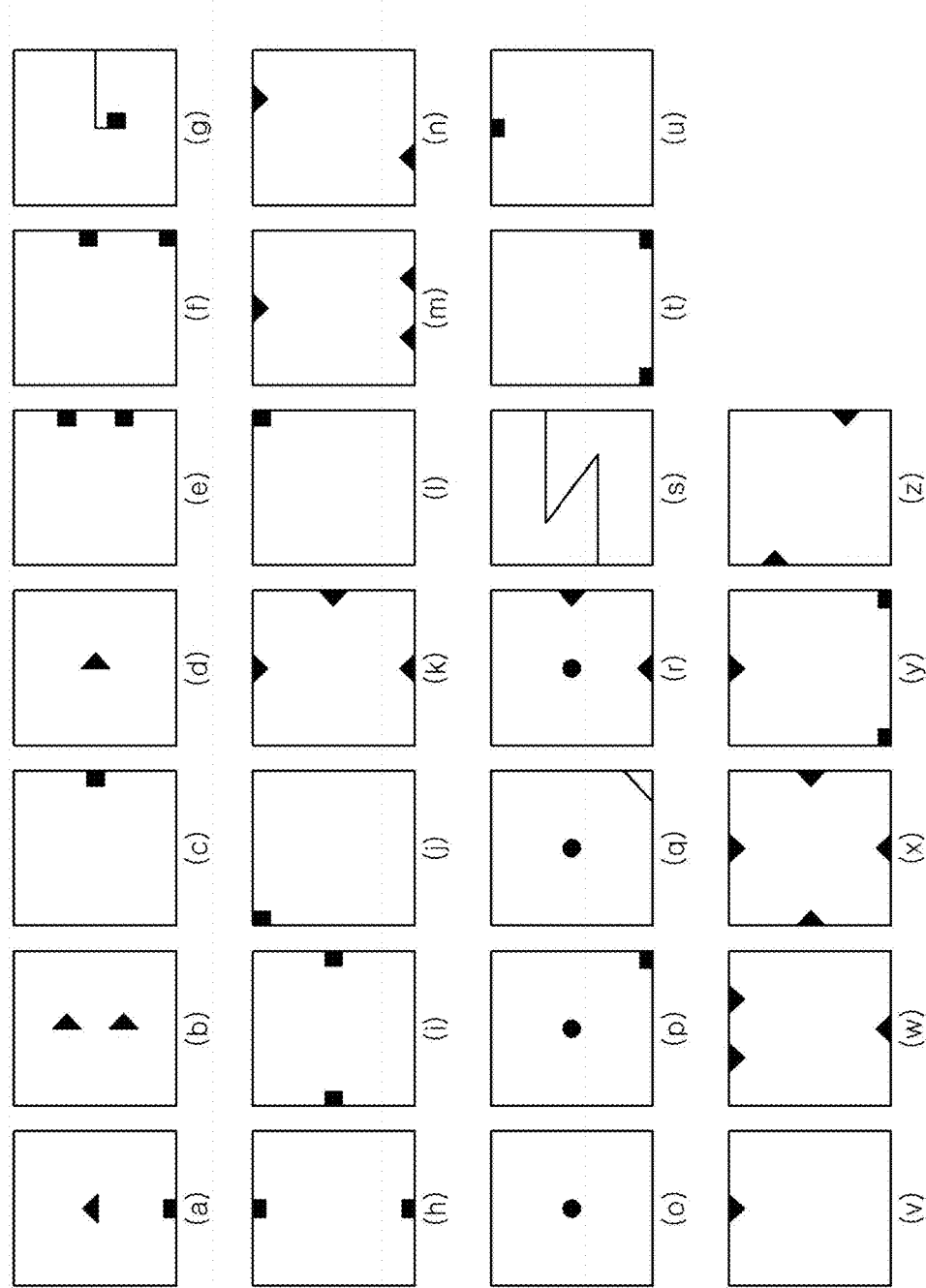
FIGS. 16A to 16Z are diagrams illustrating the principle to generate symbol images corresponding to English capital letters in accordance with an embodiment of the present invention.
Figure 17:
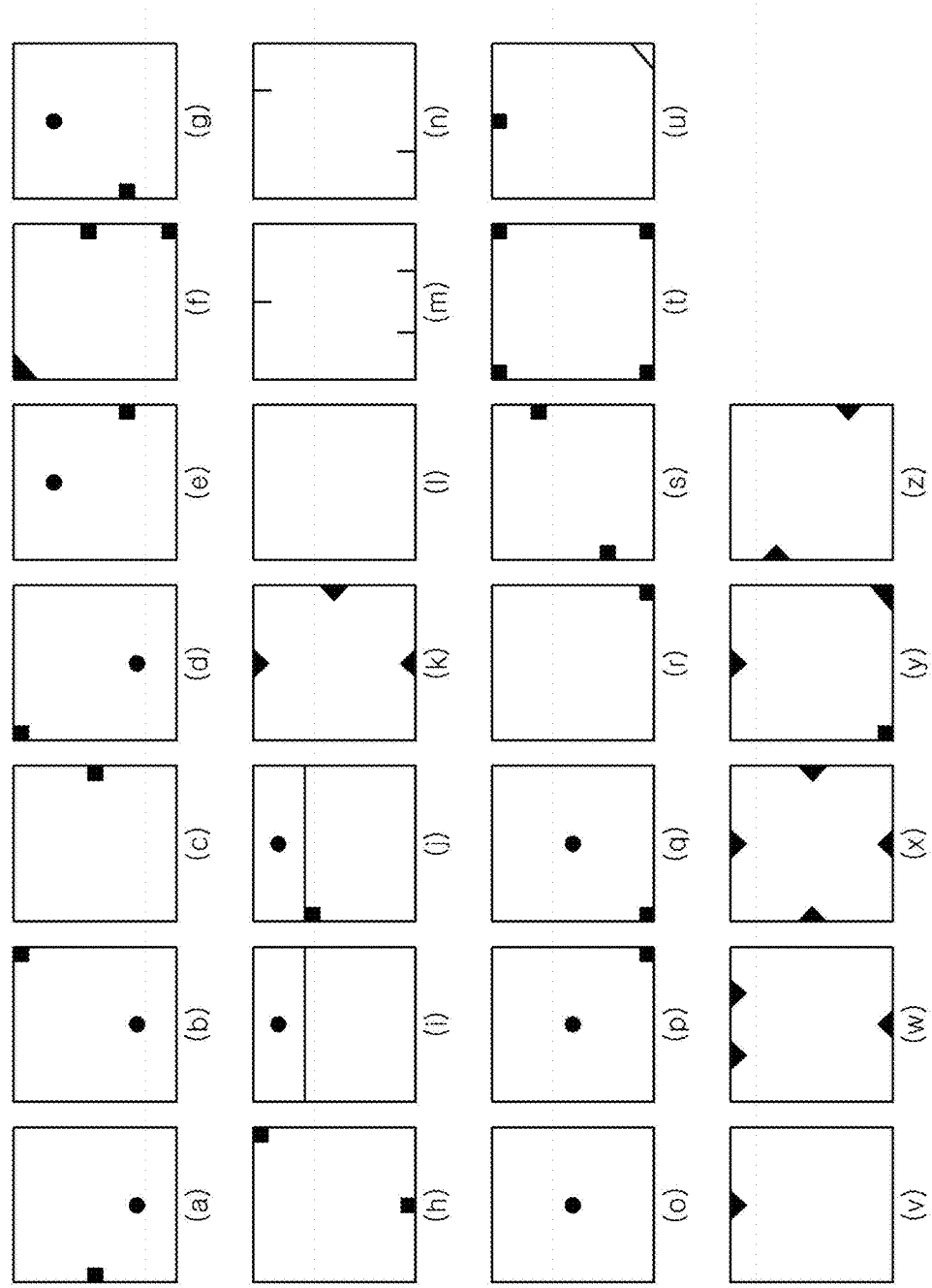
FIGS. 17A to 17Z are diagrams illustrating the principle to generate symbol images corresponding to English small letters in accordance with an embodiment of the present invention.

FIGS. 16A to 16Z illustrate the principle to generate symbol images corresponding to English capital letters in English image frames, and FIGS. 17A to 17Z illustrates the principle to generate symbol images corresponding to English small letters in an English image frame. FIGS. 16A to 16Z and FIGS. 17A to 17Z illustrate each of symbol images corresponding to English capital letters and small letters, "A(a)" to "Z(z)".

As such, while the symbol image may also be generated in the capital letters and small letters of the English alphabet in the same manner, symbol images of the English alphabet can be expressed by placing at least one symbol in a portion of space in a predetermined divided space (for example, rectangular image frame). However, since English alphabet is not divided into initial consonant/middle vowel/final consonant, it is not needed to classify the divided space (space division) again. Here, a symbol is formed by putting the English alphabet into a predetermined frame and simplifying its shape identified from a vacant space as dots, lines and faces. In this case, the dots may have a variety of shapes such as triangle, rectangle and circle.

Accordingly, symbol images of the English alphabet or numerals displayed on a display screen of the output 140 are expressed as a space divided desirably to express at least one English character or numerals, and a symbol being at least one among triangle, rectangle, circle and straight line, which are placed in the space and can symbolically express the English alphabet or numerals. Here, each space may be separately placed in the transversal direction or longitudinal direction. Further, the symbol can be at least one of the objects having a shape of triangle, rectangle, circle and polygon, and characters that remind of the polygon.

Since the method for inputting numerals or English words, analyzing and outputting symbol images for them is the same as the method for inputting characters, and analyzing and outputting symbol images for them, detailed description is omitted.

Figure 18:
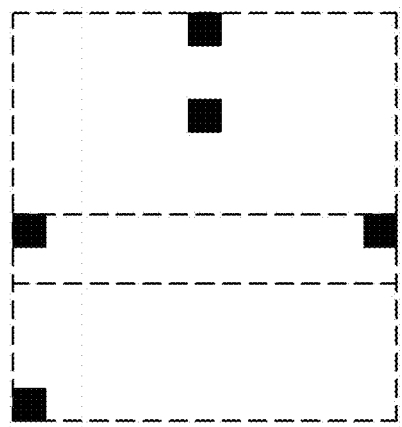
FIG. 18 is a diagram illustrating a use of dots in a space division in accordance with an embodiment of the present invention.
Figure 19:
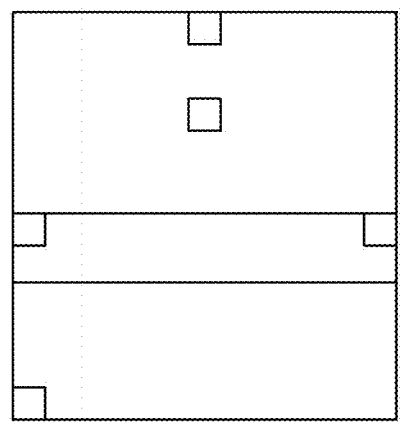
FIG. 19 is a diagram illustrating a use of lines in a space division in accordance with an embodiment of the present invention.
Figure 20:
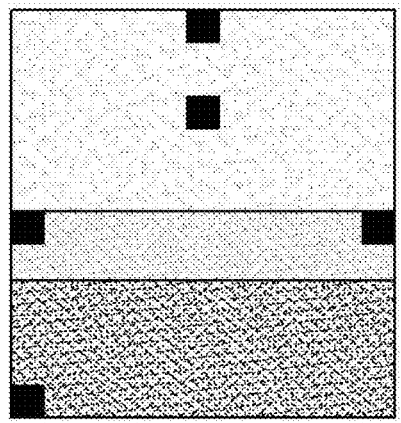
FIGS. 20 and 21 are diagrams illustrating a use of faces in a space division in accordance with an embodiment of the present invention.
Figure 21:
Figure 22:
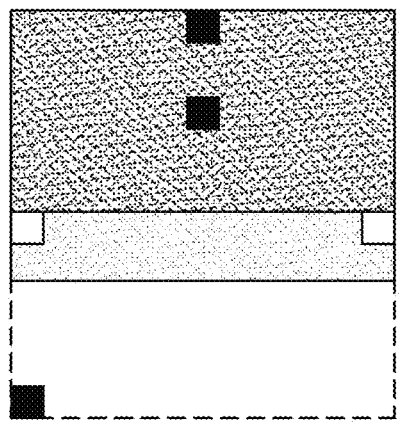
FIG. 22 is a diagram illustrating a combinational use of dots, lines and faces in a space division in accordance with an embodiment of the present invention.
Figure 23:
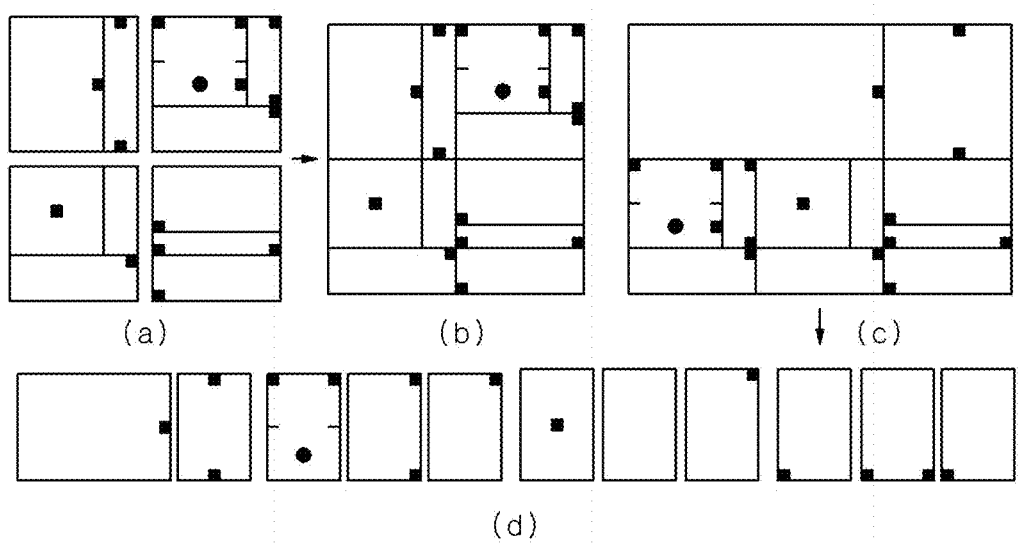

As such, dots, lines and faces can be all used in the space division. For example, FIG. 18 illustrates a space division by dots, FIG. 19 illustrates a space division by lines, FIGS. 20 and 21 illustrate a space division by faces, and FIG. 22 illustrates a space division by a combination of dots, lines and faces. For example, when dots and lines are simultaneously used as illustrated in FIG. 22, it would be convenient to express a final consonant of a character or a small letter.

Also, since space or space division is also freely reconstructed, when expressing a character of "대한민국" as described in FIGS. 23A to 23D, it is possible to take a variety of transformations such as space (FIG. 23A) in which each character is independent, space (FIG. 23B) and (FIG. 23C) in which neighboring characters share borders together, and space (FIG. 23D) in which initial consonant, middle vowel and final consonant are separated and expressed independently.

In a space of the rectangular image frame, the space may be divided (space division) and at least one symbol may be placed in a portion of the space that is divided by space division, and the peripheral formation of the image frame and the peripheral formation of the space division may be freely reconstructed as illustrated in FIGS. 24 to 27.

Figure 24:
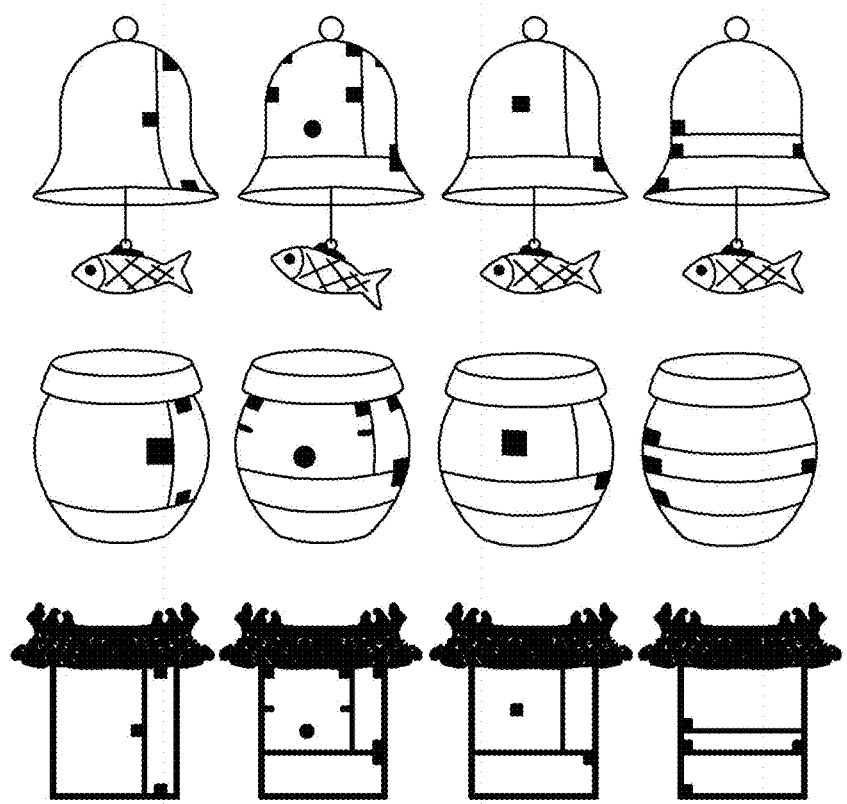
Figure 25:
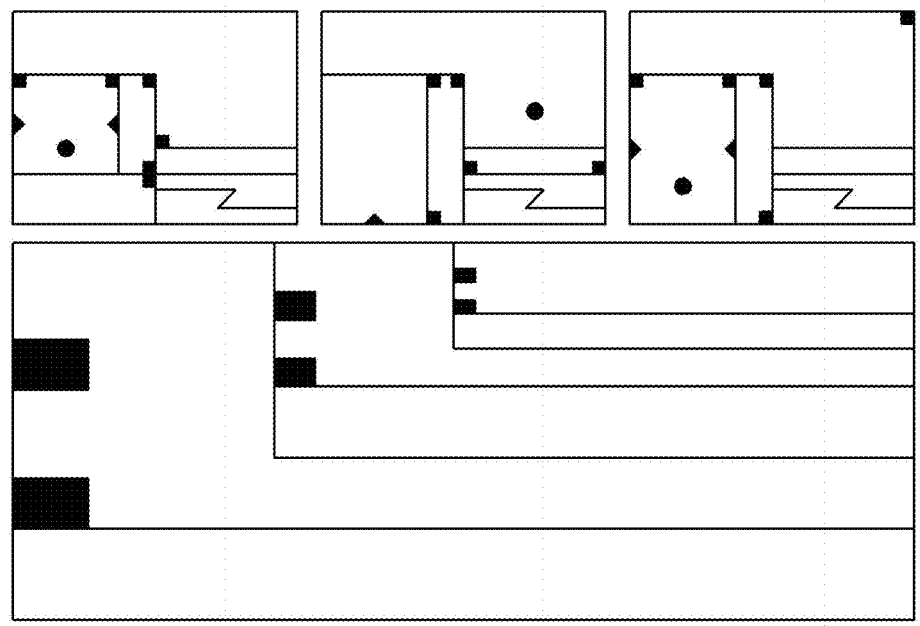
Figure 26:
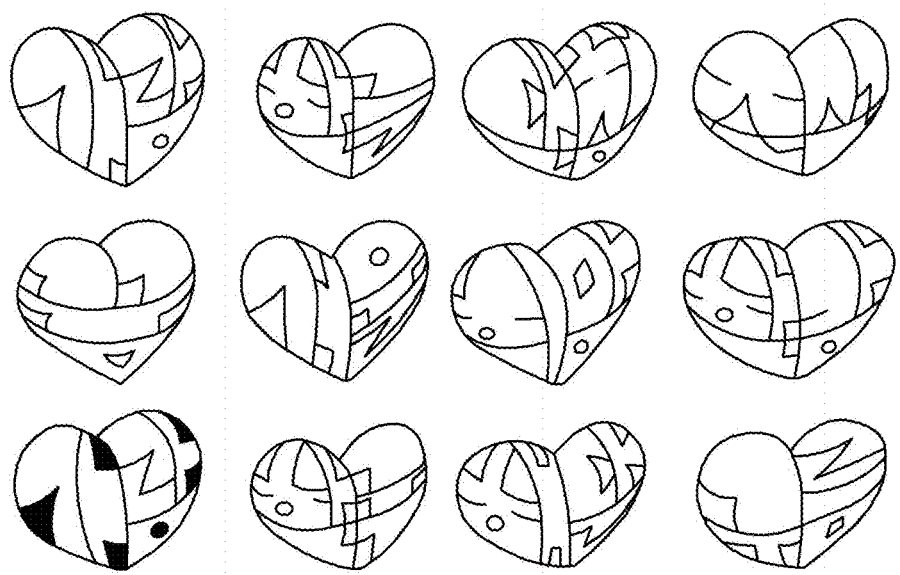

FIG. 24 is a diagram illustrating outside of a space divided by space division with a bell, a crock and a Koran-style house. Further, FIG. 25 is a diagram illustrating a free deformation of space construction in the space division, and FIG. 26 is a diagram illustrating a free deformation of the outside of space division.

Figure 27:
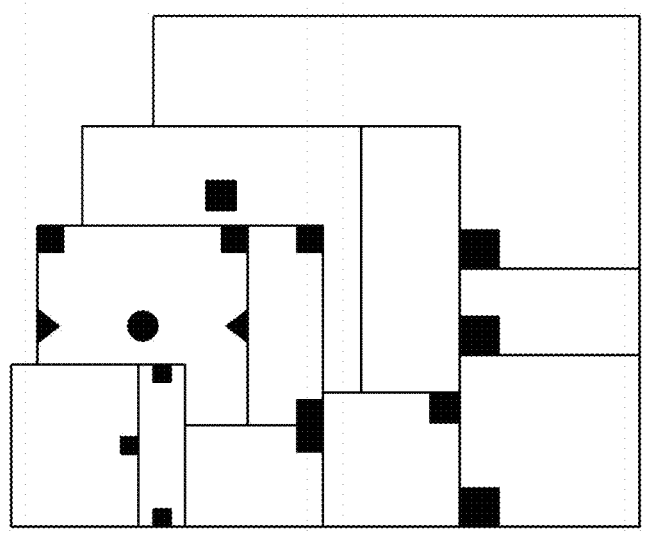

Further, FIG. 27 is a diagram illustrating an application in which the outside of the space division is deformed and overlapped when applied to city buildings.

Figure 28:
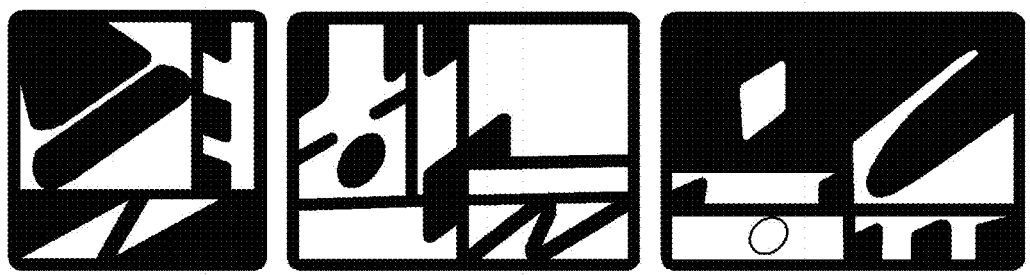
FIG. 28 is a diagram illustrating exaggeration and positional change of symbols in accordance with an embodiment of the present invention.

Further, a symbol that is placed in a space classified by the space division may be recognized by a positional change and an exaggeration. For example, it is possible to recognize characters by changing the position of the symbol and exaggerating it as illustrated in FIG. 28. Further, the same effect may be obtained by the idea and logic as well as a formulaic figure symbol.

Figure 29:
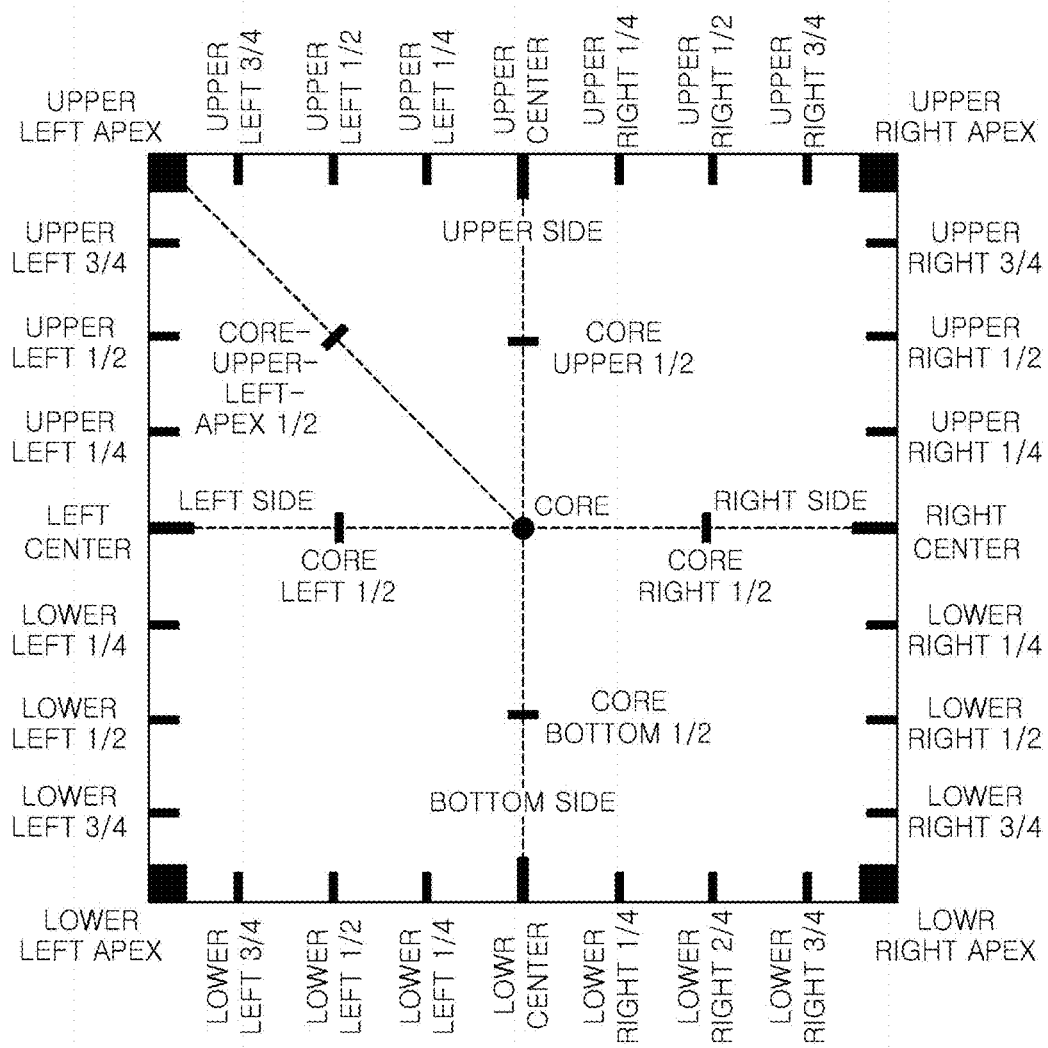
FIG. 29 is a diagram illustrating a coordinate that defines symbols' position in a space division in accordance with an embodiment of the present invention.
Figure 30:
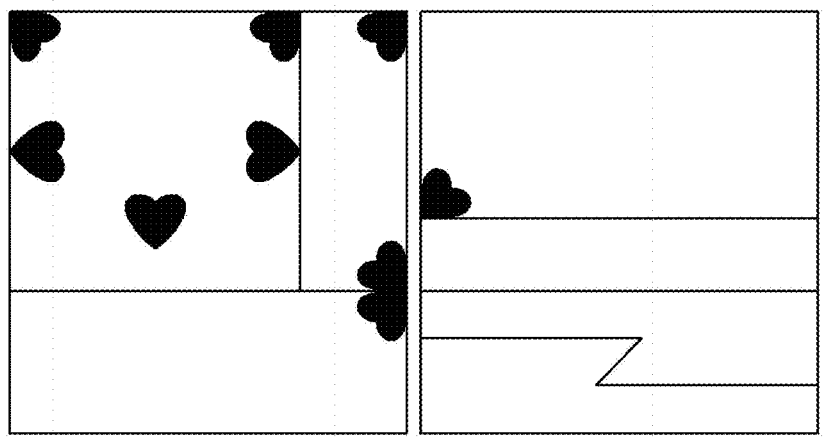
FIG. 30 is a diagram illustrating that the same symbol is used for initial consonants, middle vowels and final consonants in accordance with an embodiment of the present invention.

That is, FIG. 29 defines a coordinate in which a symbol is placed and consonant and vowel of the Korean alphabet can be defined only by this coordinate. For example, 'ㄱ' can be defined in that a symbol is placed at the left-bottom apex. Further, 'ㅏ' can be defined in that a symbol is placed at the right-upper and right-bottom apexes.

As such, all the consonants and vowels of the Korean alphabet can be defined only by their coordinates, and the same can also be applied to the English characters and numerals. With the concept of the positional coordinate of a symbol, it is possible to recognize characters even when symbols placed in the initial consonant, middle vowel and final consonant are the same.

As such, the symbol itself can be replaced by the coordinate, and figure symbols such as rectangle, circle and triangle can be substituted with other symbols to express characters.

Figure 31:
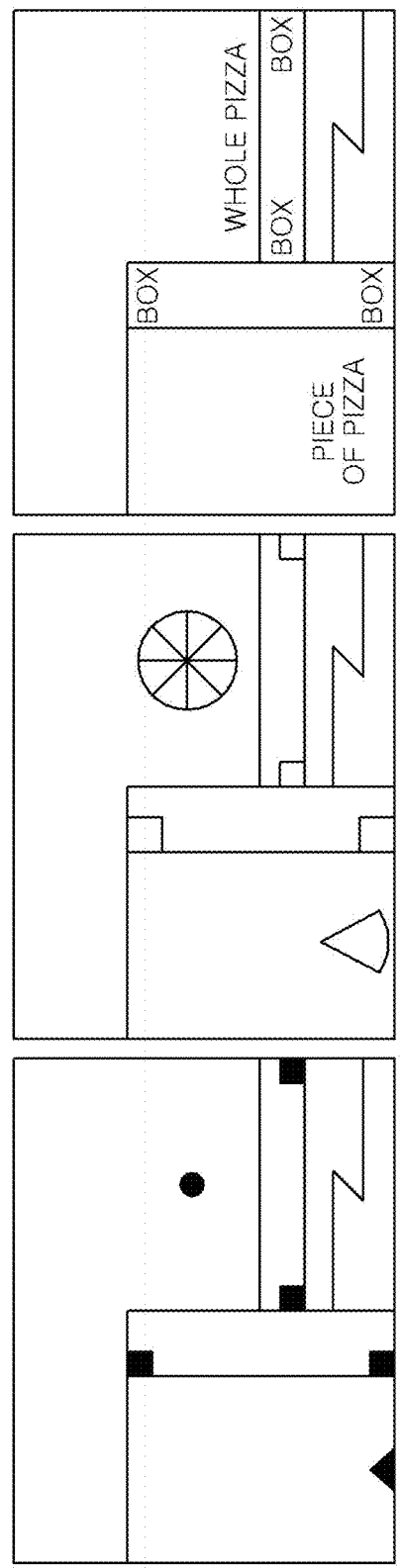
FIG. 31 is a diagram illustrating that signs, figure shaped objects, and characters are used as symbols in accordance with an embodiment of the present invention.

Meanwhile, FIG. 31 is a diagram illustrating that symbol, figure-shaped objects, and characters are used as symbols in accordance with an embodiment of the present invention, wherein the left diagram illustrates an example in which initial consonant, middle vowel and final consonant of the Korean alphabet are converted into symbols, the middle diagram illustrates an example in which the symbols are converted into objects that remind of the symbols, and the right diagram illustrates an example in which the symbols are converted into characters that remind of the objects.

That is, since a pizza box reminds of rectangle, pizza reminds of circle, and a piece of pizza reminds of lozenge, as illustrated in a right diagram of FIG. 31, it may be possible to recognize the Korean alphabet by a logical inference even when they are expressed in characters.

When a concept of dot, line and face is applied, a method applicable to express characters becomes diverse, and it becomes possible to express characters using natural geographical features such as roads, street trees, lakes, rivers, dams, bridges, buildings and artificial structures. Further, it becomes possible to express characters even using kinds of trees, texture difference (strictly, viewpoint) obtained by dividing rice paddy and dry field, color changes in autumn leaves, light and shade by the positional change of the sun.

Figure 32:
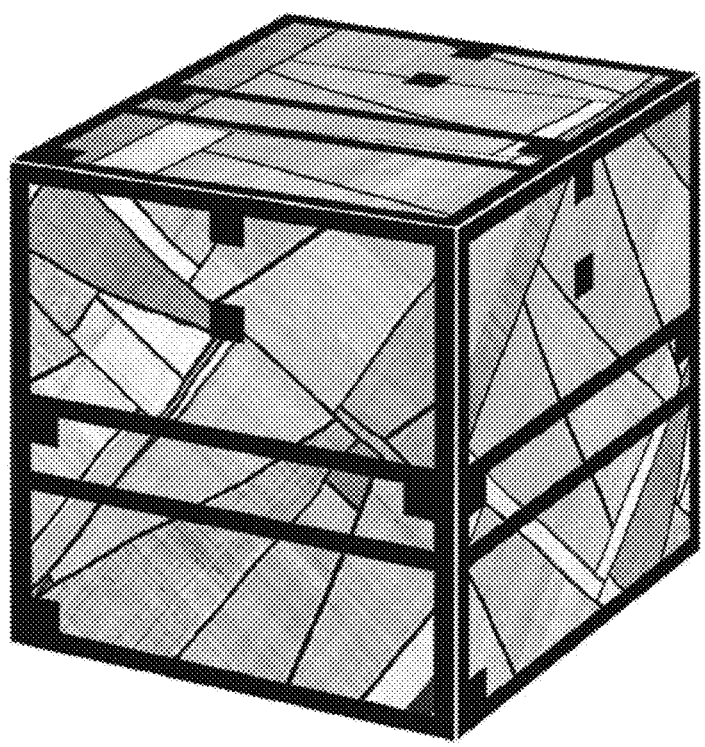
FIG. 32 is a diagram illustrating that space division and stained glass are used as a symbol using a building in accordance with an embodiment of the present invention.

Further, the space division and the placement of symbol can be expressed even by the differences of the simple texture (strictly, viewpoint) and the color sense. That is, division of space can also be recognized not only by a solid line, but also by difference of texture. For example, as in the case of the initial consonant space being filled with asphalt, the middle vowel space being filled with red clay and the final consonant space being filled with sand, three spaces are recognized separately by the color or texture (strictly, viewpoint) of the filled substances. Likewise, the space division and placement of the symbol can be expressed by such substances. FIG. 32 is a diagram expressing the Korean alphabet using stained glass on the surface of the building.

Figure 33:
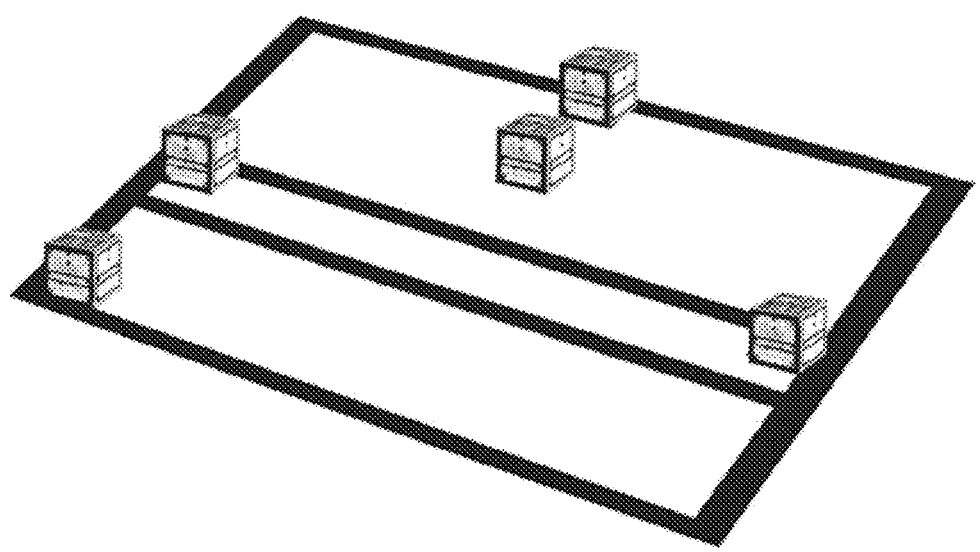
FIG. 33 is a diagram illustrating a space division using roads and a space division using buildings, in accordance with an embodiment of the present invention.
Figure 34:
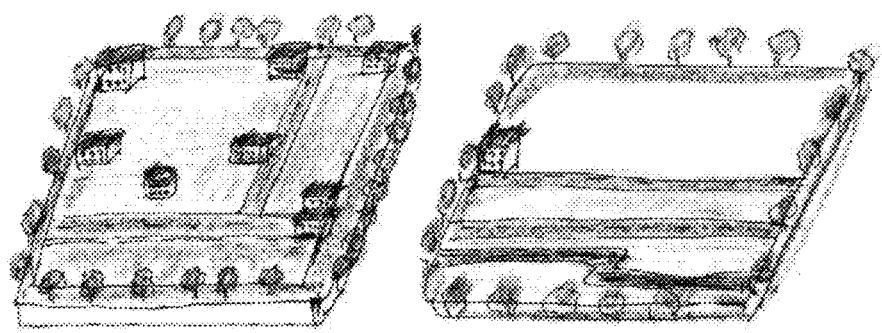
FIG. 34 is a diagram illustrating a space division using geographic features such as road, river, tree, forest and park in accordance with an embodiment of the present invention.

Further, the space division and placement of the symbol may also be expressed by geographical features such as road, rice paddy and dry field, lake, river and forest. Accordingly, it is possible to express characters by utilizing the geographical features in city planning. FIG. 33 is a diagram expressing a Korean character '복' using road and building, and FIG. 34 is a diagram illustrating an example in which Korean characters '한글' is expressed through space division and placement of symbol using geographical features such as road and river, tree, forest and park.

Meanwhile, it is possible to express space divisions that are different from one another and placement of symbols to be overlapped. That is, it is possible to accomplish placement of a complicated symbol and space division by overlapping 2 symbolic images (layers 1 and 2) as illustrated in FIG. 35.

Before overlapping characters, it is necessary for each character to be marked with a different symbol in order to make it identified easily. In this case, the differentiation may be achieved by making the shapes of the symbols different or by using characters and signs. The simplest method is to differentiate by colors.

As in the first image of FIG. 35A, the character '축' is colored in black, and as in the second image of FIG. 35A, the character '복' is colored in gray first. Then, by overlapping these two symbol images, it is expressed as shown in the third image of FIG. 35A.

In this case, since the final consonants of '축' and '복' are the same '¬', if the shapes and sizes of the figures are same, the figure (final consonant image) of the second symbol image (layer 2) becomes covered by the figure of the first symbol image (layer 1). When it happens, overlapping state is identified clearly either by reducing the size of the figure (final consonant) of the first symbol image (layer 1) (FIG. 35B) or by enlarging the size of the second symbol image (layer 2) (FIG. 35C). That is, the overlapping state becomes clear by making the figure sizes of the two symbol images different from each other. Further, if the figure of the second symbol image is covered by the figure of the first symbol image and it can be inferred with ease, the figure expression of the second symbol image may be omitted (FIG. 35D).

Unique characteristics are given to the two overlapped symbol images (layers 1 and 2) to differentiate and these characteristics make each layer recognizable as an independent character.

In accordance with an embodiment, characteristics given to the layer can include not only color, texture (strictly viewpoint), brightness, chroma, shape, light and shade and pattern but also two- and three-dimensional space division. For example, as in FIGS. 9A to 9C the orders of overlapped layers are indicated by signs (identifiers) which have the same characteristics of each layer.

The number of identifiers is displayed in the same number as the layer, and the order of the identifiers is determined vertically from 'top' to 'bottom' or horizontally from 'left' to 'right' depending on the reading method of the characters Therefore, the identifier placed on the uppermost and left side indicates the first layer.

For example, an identifier (black identifier) that is identical to at least one of the color, light and shade, brightness, pattern and texture of the first symbol image (layer 1) generated earlier is displayed at the front as illustrated in the first image of FIGS. 9A to 9C and an identifier (gray identifier) that is identical to at least one of color, light and shade, brightness, pattern and texture of the second symbol image (layer 2) generated lately is displayed at the back as illustrated in the first image of FIGS. 9A to 9C.

Figure 9:
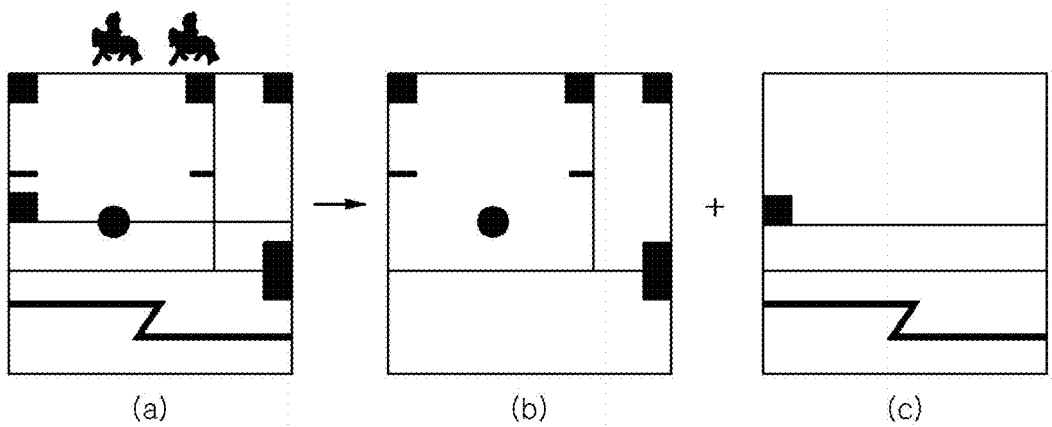
FIGS. 9A to 9C are diagrams illustrating another example of the edited Korean alphabet image in accordance with an application of the present invention.

In the two symbol images (layers 1 and 2) that are overlapped as in the first image of FIGS. 9A to 9C, '한' is decoded first as in the second image of FIGS. 9A to 9C and '글' is decoded later as in the third image of FIG. 9. As a result, the overlapped first image is decoded as '한글'.

As aforementioned, while the preferred embodiments of the present invention has been shown and describe, the present invention is not limited to the specific embodiments described above, and can be implemented in various modifications by those skilled in the art to which the present invention pertains without departing from the scope of the present invention recited in the appended claims, and such modifications should not be understood to depart from the technical spirit or prospect of the present invention.

The terms used herein are embodied only to describe specific embodiments, but are not intended to limit the present invention thereto. The representation of the singular, unless if clearly indicates in the context otherwise, includes multiple representations. In the present application, it should be understood that the term "includes or comprises" or "has", and variants thereof are used to specify the presence of features, figures, steps, operations, components, elements, or combination thereof listed herein, but are not intended to exclude the possibility of presence or supplement of one or more pieces of the features, figures, steps, operations, components, elements, or combination thereof.

INDUSTRIAL APPLICABILITY

The present invention is acknowledged to have an industrial applicability in the field of graphic design industry for various products.

The invention claimed is:

1. A method for creating at least one dot image by using a dot image creating apparatus, comprising:
   (a) acquiring, by the apparatus, information on a character, wherein the information on the character includes a geometry of the character and an empty space within a subject region surrounding the geometry of the character, and wherein the empty space is an area within the subject region not occupied by the geometry of the character;
   (b) assigning, by the apparatus, first metadata to portions within the subject region corresponding to the character, wherein the first metadata has a first color;
   (c) assigning, by the apparatus, second metadata to portions of the subject region corresponding to the empty space not occupied by the character, wherein the second metadata has a second color;
   (d) reassigning, by the apparatus, the first metadata to have the second color and the second metadata to have the first color;
   (e) adjusting, by the apparatus, a ratio of an area of the first metadata to an area of the second metadata while maintaining the information on the geometry of the character by increasing the area of the first metadata within the subject region and by decreasing the area of the second metadata within the subject region, wherein the adjusted second metadata corresponds to the dot image; and (f) outputting, by the apparatus, the dot image only without outputting the character, wherein the dot image per se represents the information on the geometry of the character.

2. The method of claim 1, further comprising adjusting a size or position of the generated dot image.

3. The method of claim 1, wherein a shape of the dot image is determined depending on a shape of the empty space.

4. The method of claim 1, wherein a shape of the dot image comprises any one of a triangle, a rectangle and a circle.

5. The method of claim 1, further comprising additionally generating, by the apparatus, a second dot image on a position corresponding to that of the empty space that is relevant to information on the character received additionally from the outside.

6. The method of claim 5, further comprising overlapping, by the apparatus, the second dot image on the dot image.

7. The method of claim 6, wherein the dot image is identified from the second dot image depending on at least one of color, light and shade, brightness, pattern and texture.

8. The method of claim 1, wherein generating the dot image comprises generating the dot image on a position corresponding to that of the empty space in each image for initial consonant, middle vowel and final consonant of the Korean alphabet that are relevant to Korean alphabet information of the received character.

9. A method for creating at least one dot image by using a dot image creating apparatus, comprising:
(a) acquiring, by the apparatus, information on a character, wherein the information on the character includes a geometry of the character and an empty space within a subject region surrounding the geometry of the character, and wherein the empty space is an area within the subject region not occupied by the geometry of the character;
(b) assigning, by the apparatus, first metadata to portions within the subject region corresponding to the character by referring to the geometry of the character, wherein the first metadata has a first color;
(c) assigning, by the apparatus, second metadata to portions of the subject region corresponding to the empty space not occupied by the character, wherein the second metadata has a second color;
(d) reassigning, by the apparatus, the first metadata to have the second color and the second metadata to have the first color, wherein the reassigned second metadata corresponds to the dot image, and adjusting, by the apparatus, a ratio of an area of the first metadata to an area of the second metadata while maintaining the information on the geometry of the character by increasing the area of the first metadata within the subject region and by decreasing the area of the second metadata within the subject region, wherein the adjusted second metadata corresponds to the dot image; and
(e) outputting, by the apparatus, the dot image only without outputting the character, wherein the dot image per se represents the information on the geometry of the character.

10. A non-transitory machine readable recording medium including a computer-executable program, when executed, to cause a machine to perform the method of claim 1.

11. An apparatus for editing a character image, comprising:
an input configured to acquire information on a character, wherein the information on the character includes a geometry of the character an empty space within a subject region surrounding the geometry of the character, and wherein the empty space is an area within the subject region not occupied by the geometry of the character; and
a processor configured to assign first metadata, having a first color, to portions within the subject region corresponding to the character, assign second metadata, having a second color, to portions of the subject region corresponding to the empty space not occupied by the character, reassign the first metadata to have the second color and the second metadata to have the first color, adjust a ratio of an area of the first metadata to an area of the second metadata while maintaining the information on the geometry of the character by increasing the area of the first metadata within the subject region and by decreasing the area of the second metadata within the subject region, and output a dot image only without outputting the character,
wherein the adjusted second metadata corresponds to the dot image, and
wherein the dot image per se represents the information on the geometry of the character.

12. The apparatus of claim 11, wherein the processor is configured to adjust a size or position of the dot image generated by the processor.

13. The apparatus of claim 11, wherein a shape of the dot image is determined depending on a shape of the empty space.

14. The apparatus of claim 11, wherein a shape of the dot image comprises any one of a triangle, a rectangle and a circle.

15. The apparatus of claim 11, wherein the processor is further configured to additionally generate a second dot image on a position corresponding to that of the empty space that is relevant to the information on the character additionally received at the input.

16. The apparatus of claim 15, further comprising an editor structure of the processor that overlaps the second dot image on the dot image.

17. The apparatus of claim 16, wherein the dot image generated and the second dot image are identified from each other depending on at least one of color, light and shade, brightness, pattern and texture.

18. The apparatus of claim 11, wherein the processor generates the dot image on a position corresponding to that of the empty space in each image by initial consonant, middle vowel and final consonant of the Korean alphabet that are relevant to Korean alphabet information of the received character.

19. An apparatus for editing a character image, comprising:
an input configured to acquire information on a character, wherein the information on the character includes a geometry of the character and an empty space within a subject region surrounding the geometry of the character, and wherein the empty space is an area within the subject region not occupied by the geometry of the character; and a processor configured to
assign first metadata, having a first color, to portions within the subject region corresponding to the character, assign second metadata, having a second color, to portions of the subject region corresponding to the empty space not occupied by the character, reassign the first metadata to have the second color and the second metadata to have the first color, and output a dot image only without outputting the character, and
adjust a ratio of an area of the first metadata to an area of the second metadata while maintaining the information on the geometry of the character by increasing the area of the first metadata within the subject region and by decreasing the area of the second metadata within the subject region, wherein the adjusted second metadata corresponds to the dot image,
wherein the dot image per se is an image in which dots are formed on a position determined by the processor that represents the information on the geometry of the character.

20. The apparatus of claim 19, wherein the processor is configured to adjust a size or position of the dot image generated by the processor.

21. An apparatus for editing a character image, comprising:
a processor configured to convert a character into a corresponding symbol image by acquiring information on a geometry of the character and an empty space within a subject region surrounding the geometry of the character, wherein the empty space is an area within the subject region not occupied by the geometry of the character, assign first metadata, having a first color, to portions within the subject region corresponding to the character, assign second metadata, having a second color, to portions of the subject region corresponding to the empty space not occupied by the character, reassign the first metadata to have the second color and the second metadata to have the first color, and adjust a ratio of an area of the first metadata to an area of the second metadata while maintaining the information on the geometry of the character by increasing the area of the first metadata within the subject region and by decreasing the area of the second metadata within the subject region; and
an output configured to output and display only the converted symbol image without outputting the character,
wherein the adjusted second metadata corresponds to the converted symbol image, and
wherein the symbol image per se represents the information on the geometry of the character.

22. The apparatus of claim 21, wherein the character comprises at least one a character from the Korean alphabet, a character from the English alphabet, and a character from numerals.

23. The apparatus of claim 21, wherein the processor is configured to adjust a size or position of the symbol image.

24. The apparatus of claim 21, wherein a shape of the symbol image is determined depending on a shape of the empty space of the character.

25. The apparatus of claim 24, wherein the symbol image comprises any one of a triangle, a rectangle and a circle.

26. The apparatus of claim 21, wherein the symbol image is expressed as a first space that is desirably divided to express at least one Korean alphabet, a space division that divides the first space into second spaces using dots, lines, faces, or other expressions and symbolically expresses the Korean alphabet by performing any function of initial consonant, middle vowel, and final consonant in the divided second spaces, and at least one symbol of triangle, rectangle, circle and straight line that are placed in the second spaces classified by the space division.

27. The apparatus of claim 26, wherein each of the second spaces is constructed of the transversal direction, the longitudinal direction, or a combination thereof.

28. The apparatus of claim 26, wherein each of the first spaces is separately placed in the transversal or longitudinal direction.

29. The apparatus of claim 21, wherein the symbol image comprises an identifier configured to have at least two symbol images overlapped, differently to express at least one of color, light and shade, brightness, pattern and texture to separate each symbol image overlapped, and indicate reading order of each symbol image.

30. An apparatus for editing a character image, comprising:
a processor configured to convert a symbol image into a corresponding character by referring to a database in which a plurality of characters and their corresponding symbol images are stored; and
an output configured to display the converted character,
wherein the symbol image is formed on a position corresponding to that of an empty space in an image of the character,
wherein the database was established by performing processes of
(i) acquiring, by the apparatus, information on the respective characters, wherein the information on the respective characters include respective geometries of the respective characters and respective empty spaces within respective subject regions surrounding the respective geometries of the respective characters, and wherein the respective empty spaces are areas within the respective subject regions not occupied by the respective geometries of the respective characters,
(ii) assigning, by the apparatus, first metadata to portions within the respective subject regions corresponding to the respective characters, wherein the first metadata has a first color,
(iii) assigning, by the apparatus, second metadata to portions of the respective subject regions corresponding to the respective empty spaces not occupied by the respective characters, wherein the second metadata has a second color,
(iv) reassigning, by the apparatus, the first metadata to have the second color and the second metadata to have the first color, and adjusting, a ratio of an area of the first metadata to an area of the second metadata while maintaining the information on the geometry of the character by increasing the area of the first metadata within the subject region and by decreasing the area of the second metadata within the subject region, wherein the adjusted second metadata corresponds to the symbol image,
(v) correlating information on the portions of the respective subject regions corresponding to the respective empty spaces having the first color with their corresponding information on the respective characters and then storing the respective correlations therebetween, and
(vi) outputting the symbol image only without outputting the character, wherein the symbol image per se represents the information on the geometry of the character.

31. An editing method for a character image, comprising:
converting a character into a corresponding symbol image by: a) acquiring information on a geometry of the character and an empty space within a subject region surrounding the geometry of the character, wherein the empty space is an area within the subject region not occupied by the geometry of the character; and
b) assigning first metadata to portions within the subject region corresponding to the character, wherein the first metadata has a first color;
c) assigning second metadata to portions of the subject region corresponding to the empty space not occupied by the character, wherein the second metadata has a second color;
d) reassigning, by the apparatus, the first metadata to have the second color and the second metadata to have the first color;
e) adjusting, by the apparatus, a ratio of an area of the first metadata to an area of the second metadata while maintaining the information on the geometry of the character by increasing the area of the first metadata within the subject region and by decreasing the area of the second metadata within the subject region, wherein the adjusted second metadata corresponds to the symbol image; and
outputting and displaying the converted symbol image only without outputting the character,
wherein the adjusted second metadata corresponds to the converted symbol image, and
wherein the symbol image per se represents the information on the geometry of the character.

32. The editing method of claim 31, wherein the character comprises at least one a character from the Korean alphabet, a character from the English alphabet, and a character from numerals.

33. The editing method of claim 31, further comprising adjusting a size or position of the symbol image.

34. The method of claim 31, wherein a shape of the symbol image is determined depending on a shape of the empty space in on the character.

35. The method of claim 34, wherein the symbol image comprises any one of a triangle, a rectangle and a circle.

36. The method of claim 31, wherein the symbol image is expressed as a first space that is desirably divided to express at least one Korean alphabet, a space division that divides the first space into second spaces using dots, lines, faces, or other expressions and symbolically expresses the Korean alphabet by performing any function of initial consonant, middle vowel, and final consonant in the divided second spaces, and at least one symbol of triangle, rectangle, circle and straight line that are placed in the second spaces classified by the space division.

37. The method of claim 36, wherein each of the second spaces is constructed of the transversal direction, the longitudinal direction, or a combination thereof.

38. The method of claim 36, wherein each of the first spaces is separately placed in the transversal or longitudinal direction.

39. The method of claim 31, wherein the symbol image comprises an identifier configured to have at least two symbol images overlapped, differently express at least one of color, light and shade, brightness, pattern and texture to separate each symbol image overlapped, and indicate reading order of each symbol image.

40. An editing method for a character image, comprising:
a) converting a symbol image into a corresponding character by referring to a database in which a plurality of characters and their corresponding symbol images are stored; and
b) displaying the converted character,
wherein the symbol image is formed on a position corresponding to that of an empty space in an image of the character,
wherein the database was established by performing processes of
(i) acquiring, by the apparatus, information on the respective characters, wherein the information on the respective characters include respective geometries of the respective characters and respective empty spaces within respective subject regions surrounding the respective geometries of the respective characters, and wherein the respective empty spaces are areas within the respective subject regions not occupied by the respective geometries of the respective characters,
(ii) assigning, by the apparatus, first metadata to portions within the respective subject regions corresponding to the respective characters, wherein the first metadata has a first color,
(iii) assigning, by the apparatus, second metadata to portions of the respective subject regions corresponding to the respective empty spaces not occupied by the respective characters, wherein the second metadata has a second color,
(iv) reassigning, by the apparatus, the first metadata to have the second color and the second metadata to have the first color, and adjusting, a ratio of an area of the first metadata to an area of the second metadata while maintaining the information on the geometry of the character by increasing the area of the first metadata within the subject region and by decreasing the area of the second metadata within the subject region, wherein the adjusted second metadata corresponds to the symbol image,
(v) correlating information on the portions of the respective subject regions corresponding to the respective empty spaces having the first color with their corresponding information on the respective characters and then storing the respective correlations therebetween, and
(vi) outputting the symbol image only without outputting the character, wherein the symbol image per se represents the information on the geometry of the character.

41. A non-transitory machine readable recording medium including computer-executable instructions, when executed, to cause a machine to perform the method of claim 31.

* * * * *